United States Patent
Chen et al.

(10) Patent No.: US 11,829,717 B1
(45) Date of Patent: Nov. 28, 2023

(54) CONTEXT-BASED ABUSIVE LANGUAGE DETECTION AND RESPONSE FOR MEDIA

(71) Applicant: Amazon Technologies, Inc., Seattle, WA (US)

(72) Inventors: Jingxiang Chen, Bellevue, WA (US); Vernon Germano, Bainbridge Island, WA (US); Xiang Hao, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 319 days.

(21) Appl. No.: 16/998,794

(22) Filed: Aug. 20, 2020

(51) Int. Cl.
*G06F 40/253* (2020.01)
*G06N 20/00* (2019.01)
*G06V 20/40* (2022.01)

(52) U.S. Cl.
CPC ........... *G06F 40/253* (2020.01); *G06N 20/00* (2019.01); *G06V 20/41* (2022.01)

(58) Field of Classification Search
CPC ....... G06F 40/253; G06F 20/70; G06N 20/00; G06V 20/41
See application file for complete search history.

(56) References Cited

U.S. PATENT DOCUMENTS

| | | | |
|---|---|---|---|
| 2001/0034741 A1* | 10/2001 | Bray | H04N 21/4884 348/E5.122 |
| 2004/0049780 A1* | 3/2004 | Gee | H04N 21/44008 725/35 |
| 2009/0133048 A1* | 5/2009 | Gibbs | G06F 16/48 725/14 |
| 2019/0297042 A1* | 9/2019 | Prabhu | G06F 3/04842 |
| 2020/0073902 A1* | 3/2020 | Milazzo | G06F 16/3328 |
| 2020/0175987 A1* | 6/2020 | Thomson | G10L 15/26 |

* cited by examiner

*Primary Examiner* — Daniel C Washburn
*Assistant Examiner* — Paul J. Mueller
(74) *Attorney, Agent, or Firm* — Eversheds Sutherland (US) LLP

(57) ABSTRACT

Devices, systems, and methods are provided for context-based abusive language detection and responses. A method may include identifying text associated with first video content, and determining that a first word in the text matches a first keyword indicative of abusive language. The method may include determining a first label associated with the first word, the first label indicating that the first word is ambiguous. The method may include identifying a first sentence of the text, the first sentence including the first word. The method may include determining first and second context of the first word and the first sentence. The method may include determining, based on the first and second context, using a machine learning model, a second label associated with the first sentence, the second label indicating a probability that the first sentence includes abusive language. The method may include generating second video content for presentation.

19 Claims, 10 Drawing Sheets

CONTEXT-BASED ABUSIVE LANGUAGE DETECTION AND RESPONSE FOR MEDIA

BACKGROUND

Media, such as movies and television, is increasingly available on multiple platforms and devices, and in multiple languages. Abusive language may occur in media, and may have a negative impact on viewer experience. For example, parents may prefer that media not present abusive language when young children are watching and listening. Some evaluation techniques for abusive language in media may require intensive manual operations and may result in improper identification of and responses to abusive language in media. There is therefore a need for enhanced methods of abusive language detection for media.

Figure 1:
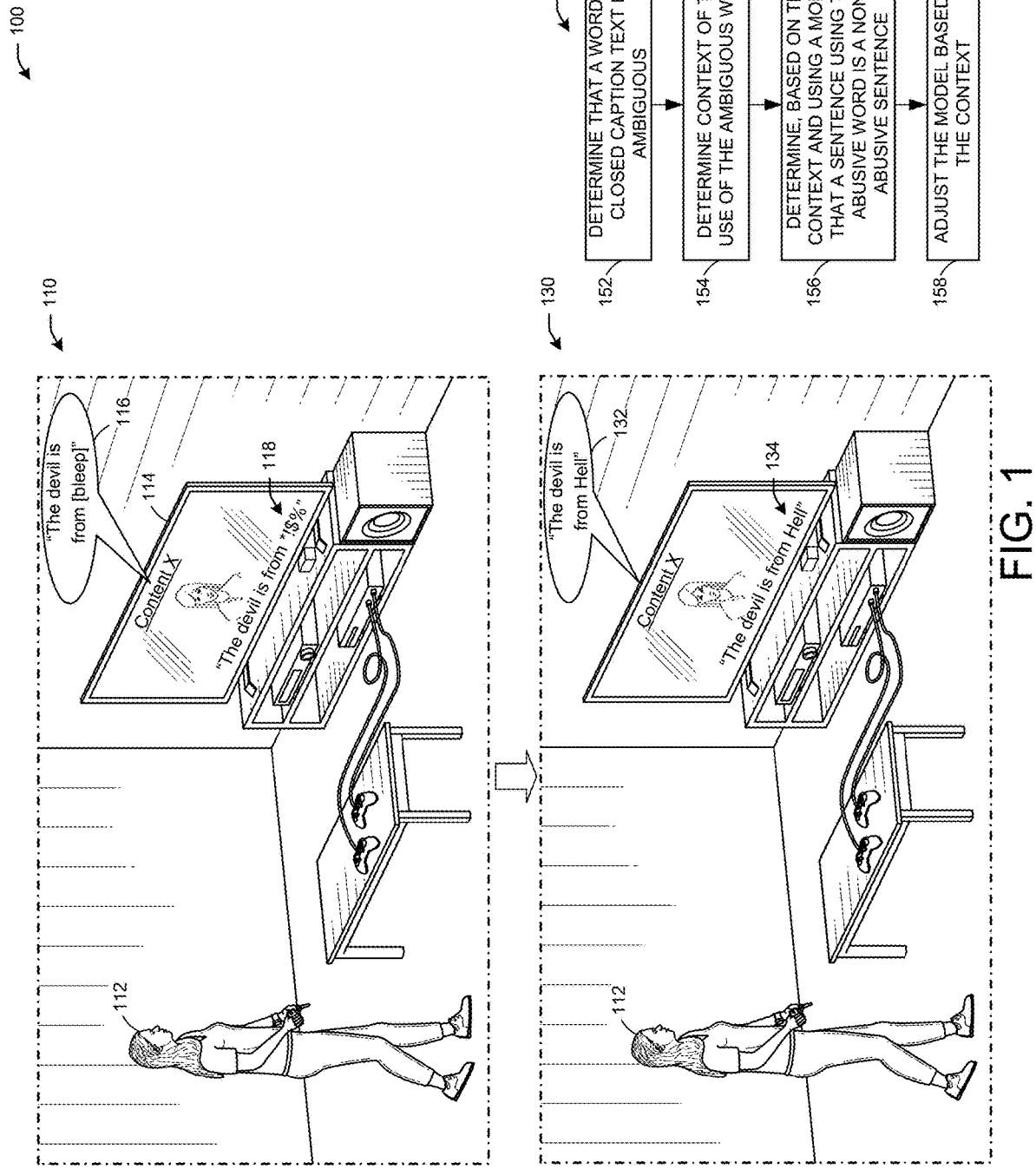
FIG. 1 illustrates an example system for context-based abusive language detection and response, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for context-based abusive language detection and response for media.

Media, such as movies, shows, video logs, and streaming video are increasingly accessible using a variety of devices and platforms, and in different formats and languages. Some media, such as video, may be presented with closed captions (e.g., text representing words and sounds presented as audio that corresponds to the video). To account for abusive language in audio and closed captions, media may be presented in edited formats (e.g., compared to the actual recorded media). For example, abusive language may be replaced with sounds (e.g., a bleep noise), non-abusive alternative language, and/or text that hides abusive words (e.g., one or more special characters or "blanks" for closed captions). In this manner, media may be edited to provide a more user friendly experience, such as by avoiding the presentation of abusive language for young audiences.

Replacing or otherwise editing abusive language in media may require identifying abusive words and phrases in audio and in closed caption text. Manually, the identification of abusive language may be an intensive, time-consuming process that may include human review of video and audio, human identification of abusive language, human rating of media, and human generation of warnings, tags, edited audio, and/or edited closed captions. Some automated approaches to identifying abusive language in media may use a list of known, predetermined abusive words and phrases that computers may use to identify matching words and phrases in media.

For example, some existing techniques to identify and respond to abusive language in media may count the number of times that abusive keywords from a list are identified in media, and based on the count and severity of the abusive keywords (e.g., as indicated by an abusive keyword list), some existing techniques may identify a media title (e.g., a video) as having abusive language. In particular, some techniques using term frequency-inverse document frequency (TF-IDF) and/or support vector machines may not be able to learn contextual information of words or phrases. In addition, because closed caption text may include hundreds of sentences, the amount of textual data may be too long for recurrent neural networks to learn. For example, some long short-term memory techniques may drop information transmission significantly when a sequence of data is too long.

In addition, some media rating systems may use a limiting number of ratings that correspond to the type and frequency of abusive language that occurs in media titles. For example, the Motion Picture Association of America (MPAA) has a rating system of G, PG, PG-13, R, NC-17, and NR. When a machine learning model is trained using such a rating system, the machine learning model may rate media according to the criteria used for the rating system (e.g., use of non-aggressive coarse language five times may result in a PG rating). However, using more ratings/levels may allow for a more nuanced analysis and rating of media based on the presence of abusive language.

Therefore, some existing techniques to identify and respond to abusive language in media may not account for the context with which a word or phrase is used, and may not identify the exact location in media where/when the abusive language occurs. In particular, some existing techniques may not identify and evaluate all forms of a keyword.

Accordingly, users and devices may benefit from an enhanced process of context-based abusive language detection and response for media.

In one or more embodiments, a computer-based system may use models (e.g., machine learning models) to identify and respond to abusive language in media. The computer-based system may determine whether identified abusive language is ambiguously abusive or non-ambiguously abusive, and may further evaluate the context of the use of ambiguously abusive language. For example, some words or phrases may be used in abusive ways and non-abusive ways (e.g., "The Devil is from Hell" may not be abusive, but "What the h*ll" may be abusive). Some words or phrases may lack any non-abusive meaning or application, and may be considered unambiguously abusive because the context in which they are used may be considered always abusive. To determine whether a word or phrase that matches an abusive word or phrase on a list of abusive words or phrases is ambiguously abusive or non-ambiguously abusive, the computer-based system may determine a first number of media titles (e.g., videos) that include an abusive keyword (e.g., in spoken language and/or closed caption text), and a second number of the first number of media titles that has a rating above the MPAA G rating (or above another rating). In this manner, the second number of media titles may represent a portion of the first number of media titles with a PG, PG-13, R, NC-17, or NR rating from among the total number of media titles that include the abusive keyword. When the portion is above a threshold (e.g., 95% or another number), the abusive keyword may be labeled unambiguously abusive (e.g., a high percentage of media titles using the abusive keyword are given a non-G rating, indicating that the abusive keyword is always or almost always abusive, regardless of its use/context). When the portion fails to exceed the threshold, the abusive keyword may be labeled as ambiguously abusive, and may be analyzed further by the computer-based system to determine whether the ambiguously abusive keyword is used in an abusive or a non-abusive manner in a particular use.

In one or more embodiments, the computer-based system may divide training closed captions (e.g., closed caption text used as training data for one or more machine learning models) into individual sentences (e.g., by identifying punctuation), parses the sentences to identify abusive keywords (e.g., and may identify multiple abusive keywords in a sentence), analyzes the contextual use of abusive keywords in respective sentences, and determines, based on the context, a probability that an abusive keyword is used abusively or non-abusively in a sentence. The computer-based system may label sentences with unambiguously abusive keywords as offensive sentences, and sentences lacking abusive keywords (e.g., all sentences from G-rated media) as non-offensive. The computer-based system may perform context-based analysis of sentences with ambiguously abusive keywords to determine whether those sentences should be labeled offensive or non-offensive (e.g., based on the context-based determination of whether an ambiguously abusive keyword is used in an abusive or non-abusive manner).

In one or more embodiments, the computer-based system may further refine the analysis of sentences. The offensive and non-offensive sentence labels may experience noise due to the analysis of ambiguous keywords. To alleviate such noise, the computer-based system may train one or more models using an intermediate classifier, facilitating the generation of sentence probability scores (e.g., probabilities that sentences contain abusive language). For example, a sentence of: "This guy sucks," may be more likely to have a high score, even when a rule for determining abusive word ambiguity (e.g., for the word "sucks") may not be based on the exact sentence, but may be based on similar sentences, such as "He sucks," and "It sucks." In this manner, labeling a sentence with a positive score may provide a more accurate estimate of whether a sentence is offensive than using a binary label of offensive or non-offensive. The intermediate classifier may include a multi-head attention model (e.g., with one hundred heads, or another number). The sentence probability scores may be used to generate training data for the model at a sentence level.

In one or more embodiments, the context that may be considered by the computer-based system to determine whether an ambiguously abusive keyword is indeed abusive may include context such as grammar/parts of speech (e.g., noun, verb, adjective, etc.), a location of the abusive keyword in a sentence (e.g., beginning, middle, end, before/after a particular word or part of speech, etc.), translations into another language, and the like. Regarding translations into another language, the computer-based system may evaluate machine translations of closed caption text into one or more other languages, and may determine whether an ambiguously abusive keyword is abusive in the one or more other languages. For example, a word in one language may be ambiguously abusive because that word may be used in some non-abusive forms, but when translated into another language, the use of the word in the other language may be more clearly abusive or non-abusive (e.g., because the translated word may not have both abusive and non-abusive uses in the other language). The computer-based system may use any one or combination of context-based evaluations to determine whether an abusive keyword is abusive or non-abusive. The computer-based system may determine which context (e.g., part of speech, word location, machine translation, etc.) is more determinative in the analysis (e.g., which context is most likely to drive the decision of whether the abusive keyword is abusive). For example, when the part of speech and location analyses do not resolve the ambiguity, but the machine translation results in a strong indication of whether an abusive keyword is abusive or not, the computer-based system may determine that the machine translation is most strongly associated with the determination of whether the abusive keyword is indeed abusive. The machine learning model may be updated with such information, allowing the model to place greater emphasis on certain types of context-based analysis for certain abusive keywords, for example.

In one or more embodiments, the multi-head attention model used by the computer-based system to analyze the labeled sentences may convert any word ($w_i$) of a sentence with n number of words into a vector (e.g., using global vectors for word presentation). The output of the vector conversion may be provided to an encoding layer (e.g., a bidirectional gated recurrent unit (BiGRU)) layer of the model with a rectified linear unit (ReLU) as an activation function. The BiGRU layer of the model may capture long-term word dependency. The output of the BiGRU layer may be units, $h_i$, provided to a m-head self-attention layer.

The use of multiple heads (e.g., m>1) may allow for the possibility that some sentences may have multiple abusive keywords (e.g., a single attention head may not cover all of the abusive keywords of a sentence, so the sentence-level analysis using a single attention head may be incomplete and inaccurate). The n-length weights of the j-th attention head may represented by: $a_j$=softmax(tanh($a_j \cdot H^T + b_j$)), for j=1, . . . , m, where H=[$h_1$, . . . , $h_n$], and ($a_j$, $b_j$) are coefficients. The elements of the vector (e.g., $a_{ij}$, . . . , $a_{nj}$) may represent the importance of any word in determining the label of a sentence for a jth attention head. The output of the attentions, $S_j$ for j=1, . . . , m, may be determined using a weighted average:

$$S_j = \sum_{i=1}^{n} aij \cdot hi.$$

The computer based system may concatenate the m outputs of the attentions using a fully connected layer with a sigmoid activation function. A loss function may be a cross-entropy, but with a label using a soft target $q_i$. In this manner, the loss may be represented by: L(p,q)=$\Sigma_i$ qilogpi, where $p_i$ is the output of the fully connected layer of the model. Sentence-level attention-based scoring examples are shown below in Table 1.

TABLE 1

Sentence Confidence Score and Weight Coefficients at the Attention Layer at One Head:

| Sentence | Score (probability that the sentence is offensive) | Attention Weights with One-Head Attention |
|---|---|---|
| The devil is from hell | 0.002 | 0.000 0.000 0.000 0.000 1.000 |
| What the hell are you doing | 0.997 | 0.000 0.000 1.000 0.000 0.000 0.000 |
| I can run circles around this jerk | 0.746 | 0.000 0.000 0.000 0.000 0.000 0.000 1.000 |
| A pillar of Jamaican cuisine is jerk chicken | 0.086 | 0.000 0.000 0.000 0.000 0.001 0.986 0.012 |
| You get sucked into a pump | 0.01 | 0.009 0.009 0.928 0.023 0.008 0.010 |
| I think that it sucks | 0.991 | 0.000 0.000 0.000 1.000 |

In this manner, the attention head weights of the far-right column of Table 1 may represent the n-length weights of the jth attention head determined by $a_j$=softmax(tanh($a_j \cdot H^T + B_j$)) as described above. The $a_j$ attention weight (e.g., 1.000 for the word "hell" in the sentence "the devil is from hell") represents the importance of the word "hell" in determining the offensive/non-offensive label of the sentence. Using the weighted average described above, the computer-based system may determine the attention output $S_j$ for a sentence.

In one or more embodiments, the computer-based system may apply active learning to the model. For example, the computer-based system may select sentences from predicted G-rated media titles, may identify media titles predicted as having abusive keywords, and may identify the sentences from the media titles predicted as having abusive keywords. The computer-based system may determine the frequency $n_i$ of keywords from the sentences of media titles predicted as having abusive keywords, and may determine the most K ambiguous sentences. The computer-based system may select N sentences for manual labeling. For example, the computer-based system may sample $$N \cdot \frac{n_j}{\sum_{i=1}^{K}} ni$$

for any allusive Keyword j in the top K keywords. The computer-based system may label the N sentences, replicate them a T number of times (e.g., five times, or another number), and combine the N sentences and sentence labels with the training set to retrain the model.

In one or more embodiments, the computer-based system actively may learn to evaluate sentences. For example, some sentence-level evaluations may experience labeling noise and may be limited due to an inadequate number of samples in the training data. Active learning and human operator labeling may allow the computer-based system to refine sentence-level analysis. The computer-based system may identify G-rated titles and identify sentences of those titles predicted as offensive. The computer-based system may determine the frequency of identified abusive keywords in the G-rated titles, and may select the most ambiguous examples (e.g., sentences having abusive language probabilities of 0.5 or between 0.4-0.6, as such sentences may be considered as less confidently offensive or non-offensive). A number of such sentences may be selected for manual review and labeling. The manually labeled sentences may be replicated and combined with an existing training data set to form an updated training data set for retraining the computer-based system.

In one or more embodiments, the computer-based system may generate labels at the media title level. For example, whereas individual sentences of a media title may be rated, the overall media title also may be rated. The computer-based system may determine the expected frequencies of abusive keywords in a media title by adding the respective scores of offensive sentences of the media title. In this manner, the title-level ratings/labels may be based on the sentence-level labeling in that the keyword counts for a title may be based on the identification and classification of sentences of the title that include abusive keywords. Rather than analyzing every word of a title for a title-level label, the computer-based system may filter offensive sentences, and analyze the offensive sentences to determine the label for the title. The computer-based system may accumulate counts of abusive keywords at any severity level, and based on the number of abusive words of different severity levels, the computer-based system may assign a label to a title. For example, title-level labels may include "none" (e.g., no abusive language), "mild" (e.g., some abusive language), "moderate," "strong," and "severe." The "strong" label may correspond to a title recommended only for viewer ages of sixteen and older, a label that does not correspond to a MPAA rating. For example, non-aggressive use of abusive keywords exceeding a threshold (e.g., ten times) in a title and less than a threshold (e.g., two times) use of disparaging slurs in the title may result in the computer-based system labeling the title as "strong."

In one or more embodiments, the computer-based system may employ a hierarchical multi-head attention network model to analyze media titles for abusive language. The hierarchical multi-head attention network model may include a word-level encoder, a word-level attention layer, a sentence-level encoder, and a sentence-level attention layer.

The hierarchical multi-head attention network model may receive as inputs closed caption sentences and abusive keywords, may determine sentence weights, and may compare the sentence weights to a threshold. Sentences whose weights satisfy the threshold may be analyzed for occurrences so that a title may be assessed for the number of occurrences of abusive language.

In one or more embodiments, the computer-based system may localize abusive keywords (e.g., determine when/where the abusive keywords occur in a title), and may respond to the occurrence of abusive keywords based on their location (e.g., within closed caption text and/or audio files). For example, the computer-based system may generate edited closed captions that replace the text of abusive keywords (e.g., by using alternative non-abusive words, replacing abusive keywords with blanks or special characters, etc.). The computer-based system may generate edited audio for the title by inserting alternative non-abusive words where abusive words are identified, muting the sound, "bleeping" the abusive keywords, and the like. The computer-based system may generate tags, warnings, or other indications to be presented to warn a viewer that a title includes abusive language, and may indicate a particular time or portion of the title when an abusive keyword may occur.

The above descriptions are for purposes of illustration and are not meant to be limiting. Numerous other examples, configurations, processes, etc., may exist, some of which are described in greater detail below. Example embodiments will now be described with reference to the accompanying figures.

ILLUSTRATIVE PROCESSES AND USE CASES

FIG. 1 illustrates an example system 100 for context-based abusive language detection and response, in accordance with one or more example embodiments of the present disclosure.

Referring to FIG. 1, the system 100 may include, at step 110, a viewer 112 who may watch media content (e.g., Content X as shown) using a device 114. The device 114 may present a combination of video and audio content corresponding to a media title (e.g., a movie, television show, video clip, etc.). Presentation of the media title may include audio 116 (e.g., corresponding to spoken words and/or sounds of the media title) and closed captions 118 (e.g., a textual representation of the audio 116). In the example shown at step 110, the audio may represent a spoken sentence, such as "The devil is from [bleep]," where the "[bleep]" may represent a sound that replaces the spoken word "hell" because "hell" is identified as an abusive word of Content X. The closed captions 118 corresponding to the sentence "The devil is from hell" may be presented with special characters in place of the text of the word "hell." In this manner, the viewer may not hear or see the abusive word "hell" when Content X is presented. However, in the sentence "The devil is from hell," the word "hell" may represent a location, and therefore a non-abusive word. In this manner, because the word "hell" may, when used differently, be considered an abusive word (e.g., a curse word), the word is edited from the Content X despite being used in a non-abusive way, undermining user experience.

Figure 3:
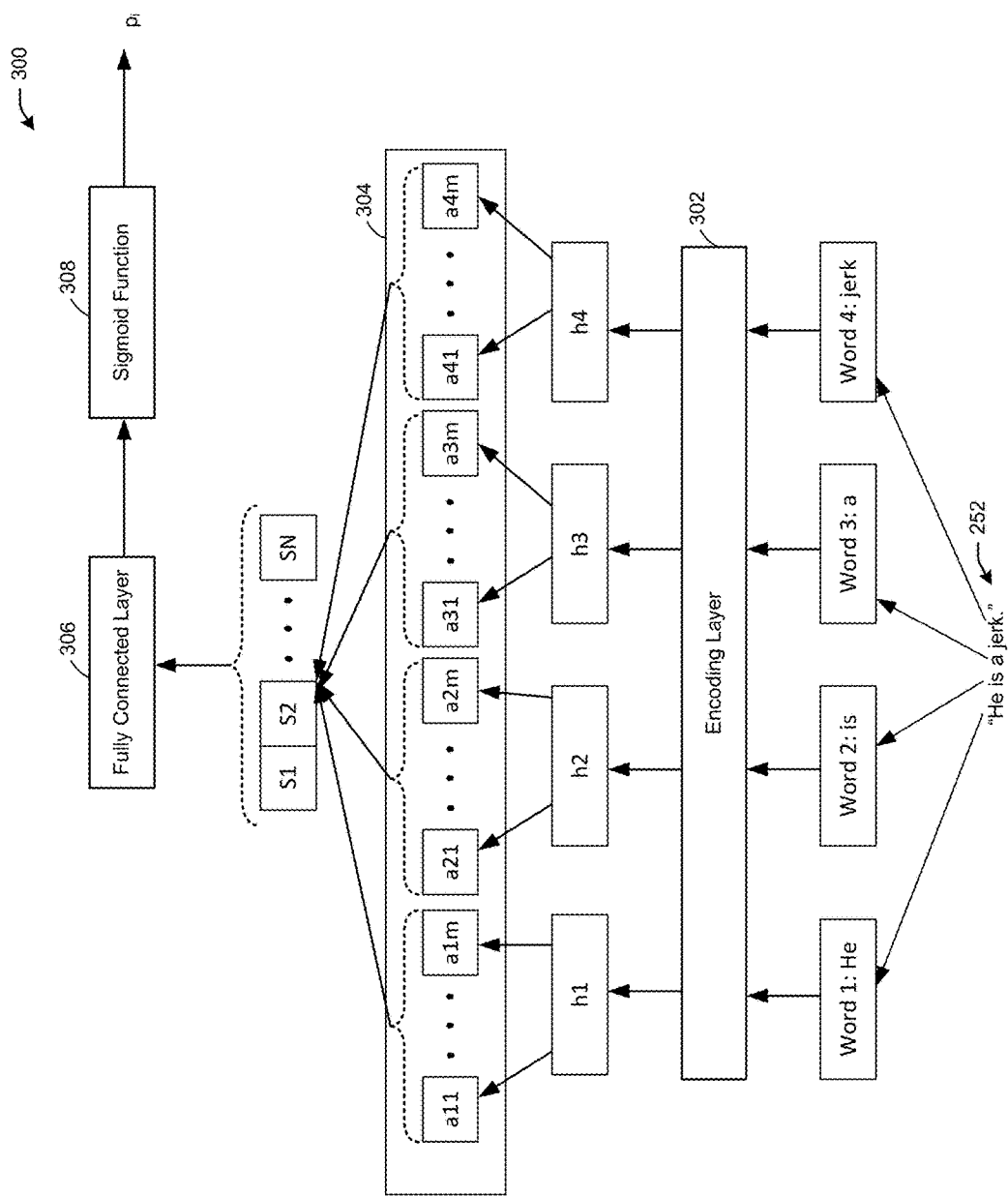
FIG. 3 illustrates an example model for context-based abusive language detection and response, in accordance with one or more example embodiments of the present disclosure.
Figure 4:
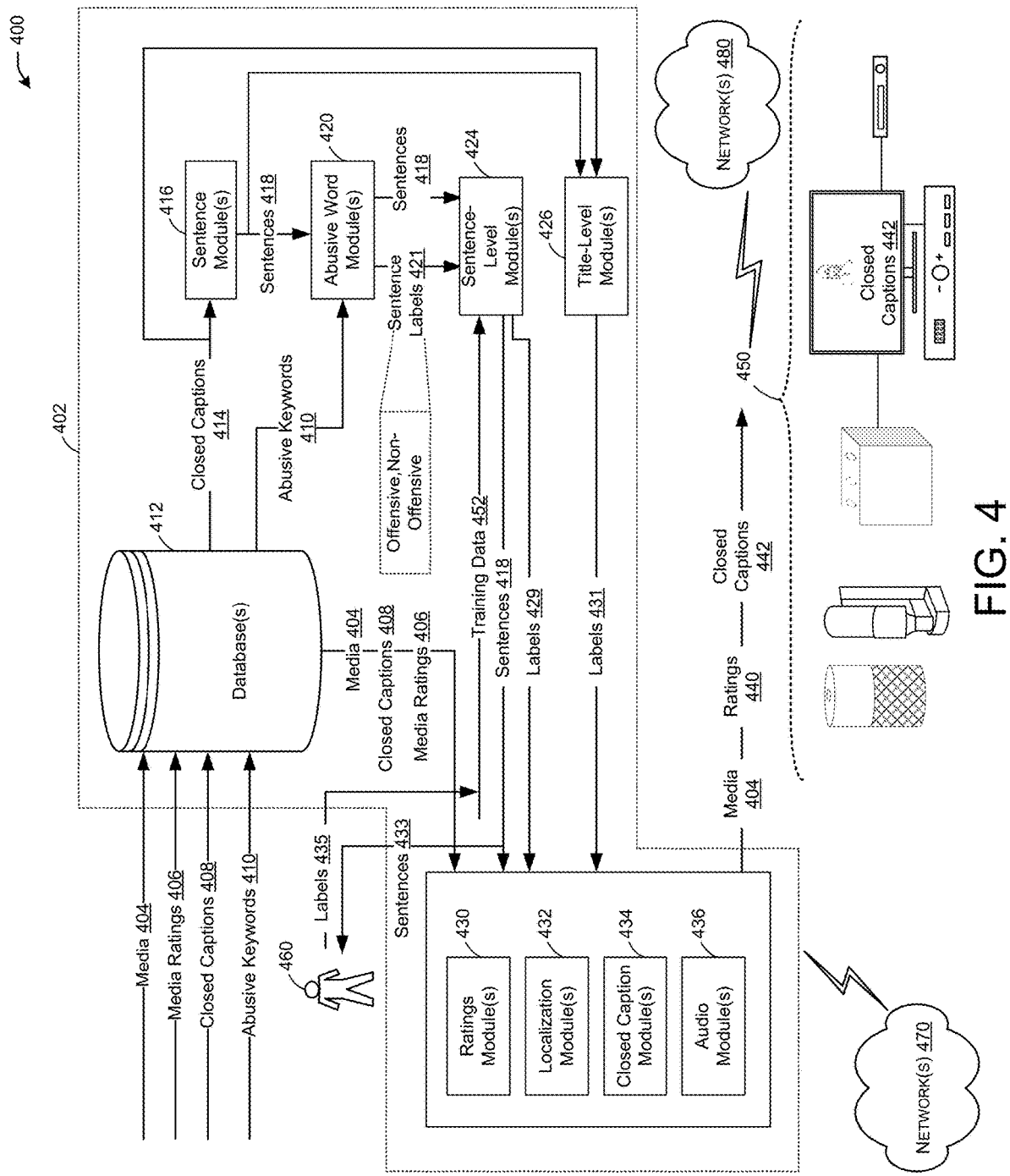
FIG. 4 illustrates an example system for context-based abusive language detection and response, in accordance with one or more example embodiments of the present disclosure.

At step 130, enhanced context-based abusive language detection and response may be employed. The result may be the audio 132 of the Content X presenting an unedited version of the sentence "The devil is from hell," and the corresponding closed captions 134 presenting the text of the sentence "The devil is from hell." In this manner, the word "hell" is not edited from the audio 132 or the closed captions 134 when the contextual application of the word "hell" is determined to represent a non-abusive application of the word "hell." A process 150 may be used to determine whether to edit the audio 132 or the closed captions 134. At block 152, a system (e.g., as shown in FIG. 4) may determine that the word "hell" of the closed captions 134 matches an abusive keyword from a list of abusive keywords, and that the word "hell" is an ambiguously abusive keyword (e.g., a number of media titles that include the word "hell" and that are rated above a G-rating by the MPAA does not exceed a threshold percentage of overall titles that include the word "hell"). At block 154, the system may analyze the context of the word "hell" in the sentence "The devil is from hell." For example, the system may determine that, in the sentence, the word "hell" is used as a noun (or pronoun) in the form of a location, that the word is at the end of the sentence, that the word is part of a prepositional phrase (e.g., "from hell"), that the sentence is not a question (e.g., a question using the word "hell," such as "What the hell?", etc.), that one or more machine translations of the sentence into another language reveal that the word "hell" in one or more other languages is not used in an abusive manner, and/or other context. At block 156, based on the context and using a model (e.g., as shown in FIG. 3), the system may determine that the sentence that uses the word "hell" (e.g., the sentence "The devil is from hell") is a non-abusive sentence. As a result of the sentence being labeled non-abusive (or non-offensive), the system may, at block 158, allow presentation of the sentence unedited, and may adjust the model based on the context that may be the most useful in determining whether the word "hell" was non-abusive (e.g., that the word was used as a location and part of a prepositional phrase). Subsequently, the model may determine that the location and grammatical use of the word "hell" is more indicative of an abusive or non-abusive use of the word "hell," and may rely more on that context than on other contextual when evaluating the word "hell" for an abusive use.

Figures 2A, 2B:
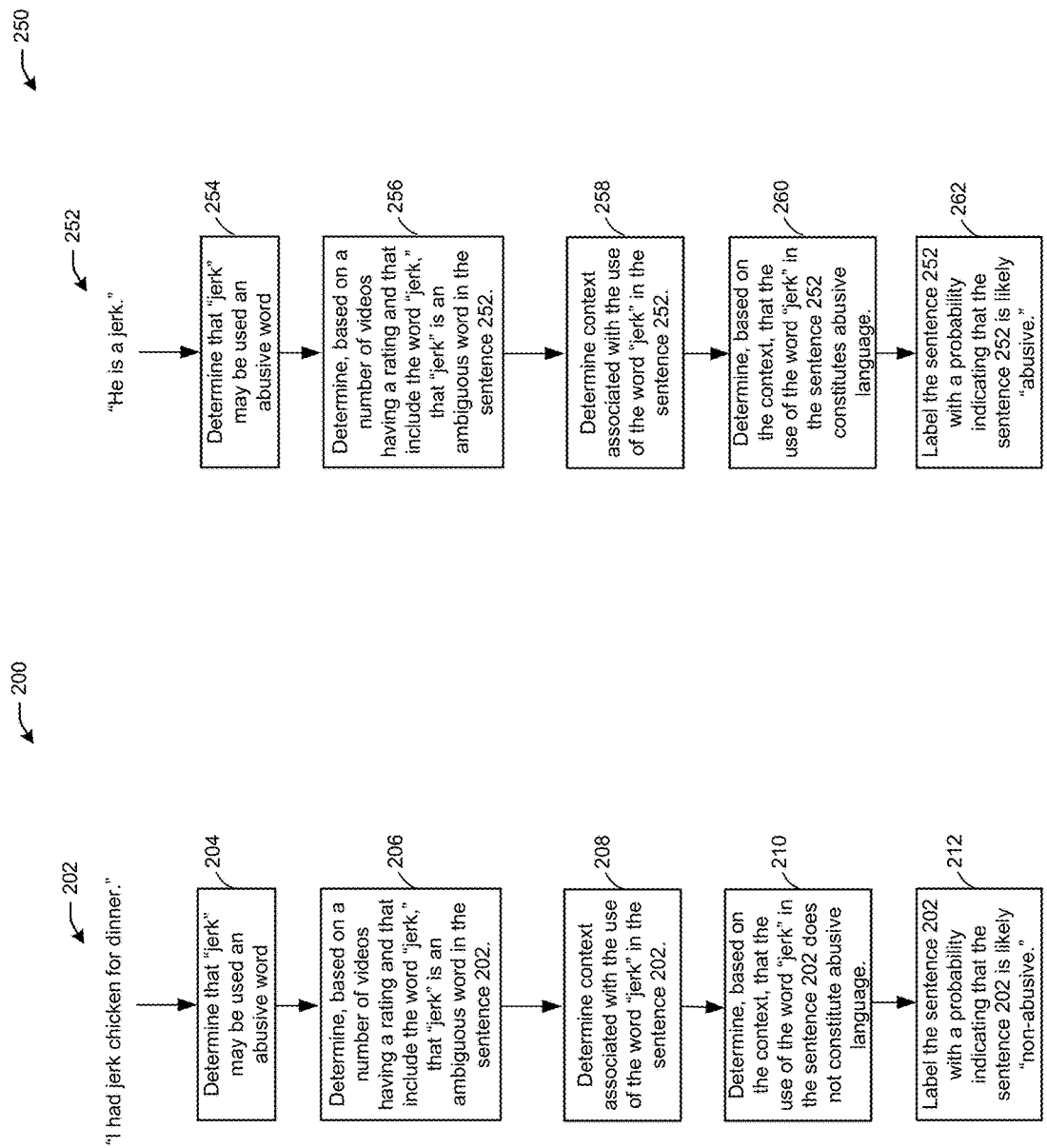
FIG. 2A illustrates an example process for context-based abusive language detection and response, in accordance with one or more example embodiments of the present disclosure.
FIG. 2B illustrates an example process for context-based abusive language detection and response, in accordance with one or more example embodiments of the present disclosure.

FIG. 2A illustrates an example process 200 for context-based abusive language detection and response, in accordance with one or more example embodiments of the present disclosure.

Referring to FIG. 2A, the process 200 may analyze the sentence 202 of "I had jerk chicken for dinner" to determine whether the sentence is offensive. At block 204, a system (e.g., see FIG. 4) may determine that the word "jerk" may be an abusive word. For example, the word "jerk" may match a word on a list of abusive keywords. To determine whether the word "jerk" is unambiguously abusive (e.g., any use of the word likely represents abusive language) or ambiguously abusive (e.g., some use of the word may represent non-abusive language), the system may evaluate a corpus of data including multiple media titles. For example, at block 206, the system may identify all of the media titles (e.g., videos) that use the word "jerk," and may identify, from among all of the media titles that use the word "jerk," the portion of the media titles whose rating exceeds a threshold rating (e.g., a rating higher than the MPAA's G-rating). When the portion of the media titles whose rating exceeds the threshold rating fails to exceed the threshold percentage of media titles, the system may determine that the word "jerk" is possibly non-abusive (and may label the keyword as ambiguously abusive). At block 208, to further analyze the ambiguously abusive use of the word "jerk" in the sentence 202, the system may determine context associated with the use of the word in the sentence 202. For example, first context may include the part of speech (e.g., adjective referring to a type of chicken, representing the subject of the verb "had" from the sentence "I had"). Second context may indicate that the word is toward the middle of the sentence (e.g., compared to "X is a jerk" as a sentence). Third context may be based on a machine translation to another language where "jerk chicken" translates into a word or phrase that does not match an abusive keyword. At block 210, based on the context, the system may determine that the word "jerk" in the sentence 202 does not constitute abusive language. At block 212, the system may label/score the sentence 202 with a probability (e.g., from 0 to 1, with 0 being non-offensive and 1 being offensive) indicating that the sentence 202 is unlikely to be offensive.

FIG. 2B illustrates an example process 250 for context-based abusive language detection and response, in accordance with one or more example embodiments of the present disclosure.

Referring to FIG. 2B, the process 250 may analyze the sentence 252 of "He is a jerk" to determine whether the sentence is offensive. At block 254, a system (e.g., see FIG. 4) may determine that the word "jerk" may be an abusive word. For example, the word "jerk" may match a word on a list of abusive keywords. To determine whether the word "jerk" is unambiguously abusive (e.g., any use of the word likely represents abusive language) or ambiguously abusive (e.g., some use of the word may represent non-abusive language), the system may evaluate a corpus of data including multiple media titles. For example, at block 256, the system may identify all of the media titles (e.g., videos) that use the word "jerk," and may identify, from among all of the media titles that use the word "jerk," the portion of the media titles whose rating exceeds a threshold rating (e.g., a rating higher than the MPAA's G-rating). When the portion of the media titles whose rating exceeds the threshold rating fails to exceed the threshold percentage of media titles, the system may determine that the word "jerk" is possibly non-abusive (and may label the keyword as ambiguously abusive). At block 258, to further analyze the ambiguously abusive use of the word "jerk" in the sentence 252, the system may determine context associated with the use of the word in the sentence 252. For example, first context may include the part of speech (e.g., a noun defining what "He is"—the object of the sentence 252). Second context may indicate that the word is the final word of the sentence 252. Third context may be based on a machine translation to another language where "a jerk" translates into a word or phrase that matches an abusive keyword and lacks a non-abusive meaning. At block 260, based on the context, the system may determine that the word "jerk" in the sentence 252 constitutes abusive language. At block 262, the system may label/score the sentence 252 with a probability (e.g., from 0 to 1, with 0 being non-offensive and 1 being offensive) indicating that the sentence 202 is likely to be offensive.

Figures 2C, 2D:
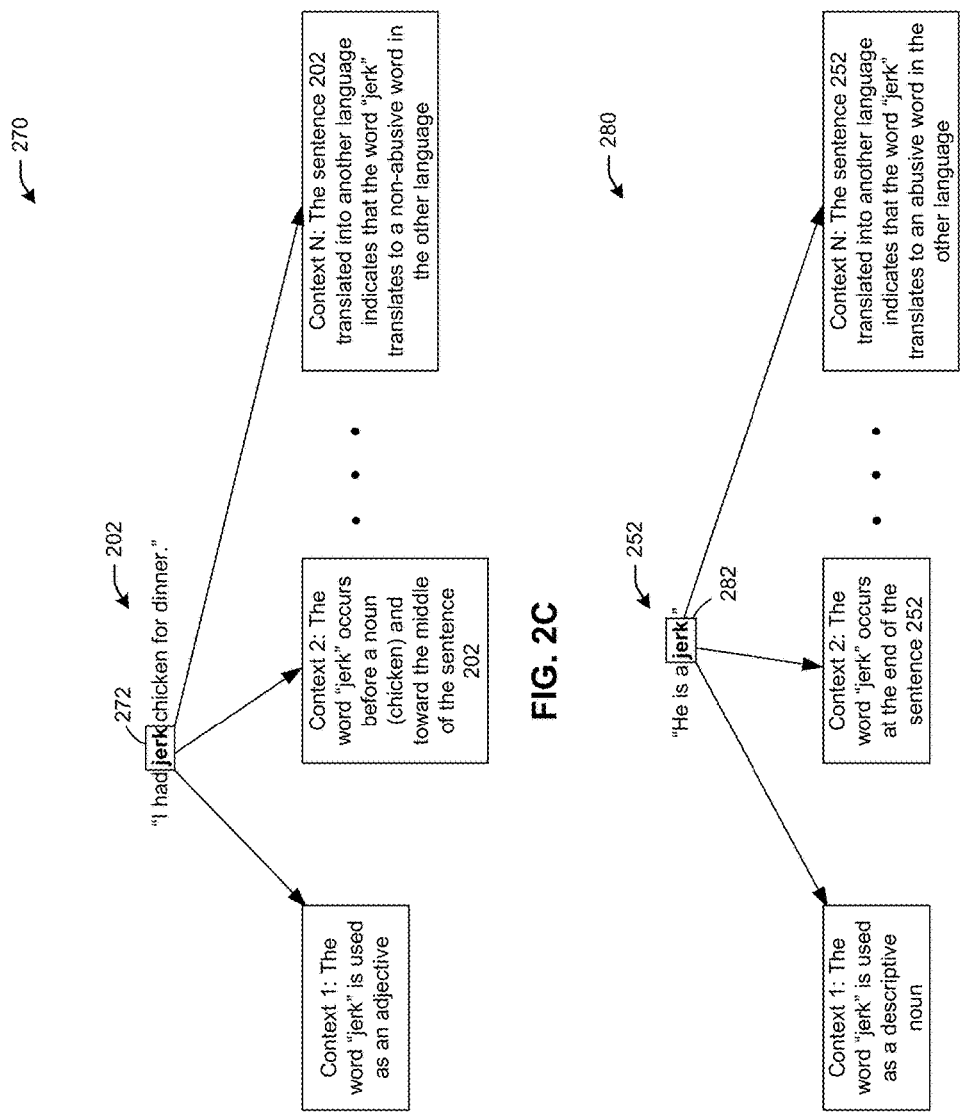
FIG. 2C illustrates an example process for context-based abusive language detection and response, in accordance with one or more example embodiments of the present disclosure.
FIG. 2D illustrates an example process for context-based abusive language detection and response, in accordance with one or more example embodiments of the present disclosure.

FIG. 2C illustrates an example process 270 for context-based abusive language detection and response, in accordance with one or more example embodiments of the present disclosure.

Referring to FIG. 2C, the process 270 may provide a context-based analysis of the sentence 202 of FIG. 2A (e.g., the context-based analysis of block 208 and block 210 of FIG. 2A). For example, first context of the use of the word 272 "jerk" in the sentence 202 may be associated with the part of speech represented by the word 272 "jerk." In the sentence 202, the word 272 "jerk" is used as an adjective to describe the noun "chicken," which is the object of the sentence, referring to what "I had" "for dinner." In this manner, the word 272 "jerk" is used to describe the object of the sentence. More particularly, the word 272 "jerk" is used to describe a type of food (e.g., compared to the verb "jerk," the noun "jerk" referring to movement or pulling, etc.). The process 270 may determine second context of the word 272 "jerk" in the sentence 202. The second context may indicate that the word 272 "jerk" appears near the middle of the sentence 202 (e.g., more proximal to the middle than to the first or last words), before the noun "chicken" that is the object of the sentence. Additional context may be considered, such as the form of the word 272 (e.g., "jerk" compared to alternative forms, such as "jerky"). A nth context-based analysis of the process 270 may include converting the sentence 202 in English to another language (e.g., using a machine translation), and analyzing whether the word 272 "jerk" translates to a word in the other language that may match an abusive keyword list in the other language. When the machine translation results in a word that does not match an abusive keyword list (e.g., "jerk chicken" in another language may translate to a word or phrase that is non-abusive, or may not have a direct translation), the process 270 may determine that the word 272 may not be offensive. Based on the contextual analysis, the process 200 of FIG. 2A may determine whether the sentence 202 is offensive or not.

FIG. 2D illustrates an example process 280 for context-based abusive language detection and response, in accordance with one or more example embodiments of the present disclosure.

Referring to FIG. 2D, the process 280 may provide a context-based analysis of the sentence 252 of FIG. 2B (e.g., the context-based analysis of block 258 and block 260 of FIG. 2B). For example, first context of the use of the word 282 "jerk" in the sentence 252 may be associated with the part of speech represented by the word 282 "jerk." In the sentence 252, the word 282 "jerk" is used as a descriptive noun—a noun describing what "He is," or the object of the sentence 252. In this manner, the word 282 "jerk" is used as the object of the sentence. The process 280 may determine second context of the word 282 "jerk" in the sentence 252. The second context may indicate that the word 272 "jerk" appears at the end of the sentence 252. Additional context may be considered, such as the form of the word 282 (e.g., "jerk" compared to alternative forms, such as "jerky"). A nth context-based analysis of the process 280 may include converting the sentence 252 in English to another language (e.g., using a machine translation), and analyzing whether the word 282 "jerk" translates to a word in the other language that may match an abusive keyword list in the other language. When the machine translation results in a word that matches an abusive keyword list in the other language, the process 280 may determine that the word 282 is likely abusive. Based on the contextual analysis, the process 250 of FIG. 2B may determine whether the sentence 252 is offensive or not.

Referring to FIGS. 2A-2D, some context may be more useful to the determination of whether a word is abusive or not. For example, when the word jerk is a noun (e.g., as in the sentence 252), the part of speech may not be a strong indication of whether the word is abusive. For example, the word "jerk" as a noun may refer to a coarse description of a person or to a tug or pulling action. A machine translation may provide a stronger indication of whether the word jerk in the sentence 252 is abusive or not. In this manner, the processes in FIGS. 2A-2D may be refined to emphasize some context of a particular word over other context when determining whether the word (and therefore the sentence using the word) is abusive. To determine which context is more strongly associated with determining whether a word is abusive, the processes may determine whether the context results in an unambiguous use of the word in a sentence, or whether the context-based analysis results in more ambiguity (e.g., such as the example of "jerk" as a noun in the sentence 252).

FIG. 3 illustrates an example model 300 for context-based abusive language detection and response, in accordance with one or more example embodiments of the present disclosure.

Referring to FIG. 3, the model 300 is shown analyzing the sentence 252 of FIG. 2B, and may analyze any sentence. The model 300 may include a multi-head attention sentence-level machine learning model as explained further herein, and may use multiple heads to analyze the words of the sentence 252 (e.g., "He," "is," "a," "jerk"), as any sentence may include multiple abusive words. The sentence 252 may be labeled as "offensive" based on the analysis of FIG. 2B and FIG. 2D. The model 300 may convert each word (e.g., word 1, word 2, . . . , word n) of the sentence 252 in to a vector for word representation (e.g., using global vectors for word presentation). The output of the vector conversion may be provided to an encoding layer 302 (e.g., a BiGRU layer) of the model 300 with a ReLU as an activation function. The encoding layer 302 of the model 300 may capture long-term word dependency, encoding words using vectors. The output of the encoding layer 302 may be units, $h_i$ (e.g., h1, h2, h3, h4 as shown for the sentence 252), provided to a m-head self-attention layer 304. The use of multiple heads (e.g., m>1) may allow for the possibility that some sentences may have multiple abusive keywords (e.g., a single attention head may not cover all of the abusive keywords of a sentence, so the sentence-level analysis using a single attention head may be incomplete and inaccurate). The n-length weights of the j-th attention head of the self-attention layer 304 may represented by: $a_j = \text{softmax}(\tanh(a_j \cdot H^T + b_j))$, for j=1, . . . , m, where H=[$h_1$, . . . , $h_n$], and ($a_j$, $b_j$) are coefficients. The elements of the vector (e.g., $a_{ij}$, . . . , $a_{nj}$) may represent the importance of any word in determining the label of the sentence 252 for a jth attention head. The output of the attentions, $S_j$ for j=1, . . . , m, may be determined using a weighted average:

$$S_j = \sum_{i=1}^{n} aij \cdot hi.$$

The model 300 may concatenate the m outputs of the attentions (e.g., S1, S2, . . . , SN) using a fully connected layer 306 with a sigmoid activation function 308. A loss function may be a cross-entropy, but with a label using a soft target $q_i$. In this manner, the loss may be represented by: $L(p,q) = \Sigma_i$ qilogpi, where $p_i$ is the output of the fully connected layer of the model. In this manner, the model 300 may determine whether the sentence 252 is offensive based on the weighted average of the words in the sentence 252. For example, Table 1 above shows the attention weights for individual words of respective sentences, and the overall score of the respective sentences, where a larger score indicates increased likelihood of the sentence being offensive.

In one or more embodiments, the attention heads of the self-attention layer 304 may use different weights represented by $a_j = \text{softmax}(\tanh(a_j H^T + b_j))$. For example, when 100 attention heads are used (e.g., m=100), 100 weights may be used. The result may be 100 different vectors (e.g., m vectors). The fully connected layer 306 may analyze a single vector, so the model 300 may concatenate the m outputs of the attentions (e.g., S1, S2, . . . , SN). In this manner, the sentence 252 may be represented by a vector of weighted average value according values, according to $$S_j = \sum_{i=1}^{n} aij \cdot hi,$$

that represent the importance of the respective words of the sentence 252 in determining whether the sentence 252 is offensive.

FIG. 4 illustrates an example system 400 for context-based abusive language detection and response, in accordance with one or more example embodiments of the present disclosure.

Referring to FIG. 4, the system 400 may include one or more devices 402 (e.g., cloud-based devices) that may ingest media 404 (e.g., videos and other presentable content in one or more languages), media ratings 406 (e.g., MPAA ratings for individual titles of the media 404), closed captions 408 (e.g., closed caption text files with text representing the audio of the media 404 in one or more languages, and abusive keywords 410 (e.g., a list of words and/or phrases known to be abusive, such as swear words, coarse language, etc.). The media 404, the media ratings 406, the closed captions 408, and the abusive keywords 410 may be stored in one or more databases 412 of the one or more devices 402. The closed captions 414 may be provided to one or more sentence modules 416 of the one or more devices 402. The one or more sentence modules 416 may analyze the closed captions 414 to identify sentences (e.g., using punctuation and/or other analysis). The identified sentences 418 and the abusive keywords 410 may be provided to one or more abusive word modules 420 of the one or more devices 402. The one or more abusive word modules 420 may determine whether any words of the sentences 418 match any of the abusive keywords 410, and may assign sentence labels 421 based on the presence of abusive keywords (e.g., using the ambiguous vs. unambiguous analysis of abusive keywords as described above). The one or more sentence labels 421 may correspond to the sentences 418 (e.g., any sentence may have a corresponding label), and may label the sentences 418 as "offensive" or "non-offensive." One or more sentence-level modules 424 (e.g., using one or more machine learning models to analyze the media 404 at a sentence-level) may receive the sentences 418 and the sentence labels 421, and may refine the sentence labels 421 by converting to a more robust soft target by analyzing the context of abusive words identified in the sentences 418 (e.g., using the processes in FIGS. 2A-2D).

Still referring to FIG. 4, the sentences 418 and the closed captions 414 may be provided to one or more title-level modules 426 to determine title-level labels 431 based on the occurrences and severity of the abusive keywords 410 (e.g., as indicated by a list of the abusive keywords 410). As described with regard to FIG. 3, the one or more sentence-level modules 424 may evaluate whether specific sentences are offensive. As described further below, the one or more title-level modules 426 may determine whether individual media titles are offensive based on the sentences used by the respective media title. The one or more sentence-level modules 424 may provide the sentences 418 and labels 429 (e.g., refined sentence-level labels for the sentences 418) to one or more additional modules to respond to the identification of abusive language in the media 404. The one or more title-level modules 426 may provide the title-level labels 431 to the one or more additional modules to respond to the identification of abusive language in the media 404. The one or more additional modules (e.g., one or more ratings modules 430, one or more localization modules 432, one or more closed caption modules 434, one or more audio modules 436) may receive the sentences 418, the labels 429, the media 404, the closed captions 408, the media ratings 406, and the title-level labels 431 and may generate edited media 404 (e.g., media with replaced words or sounds for abusive language), edited ratings, edited closed captions 442 (e.g., replacing abusive words with non-abusive words or special characters, etc.) for presentation by one or more devices 450. For example, the one or more ratings modules 430 may map the accumulated counts of abusive keywords in a media title to one of five ratings (e.g., which may differ from the MPAA ratings). The one or more localization modules 432 may identify the sentences 418 that include abusive language (e.g., using the sentence-level ratings), and may provide the timing/location of abusive language in the sentences 418 to the one or more closed caption modules 434 and/or to the one or more audio modules 436. The one or more closed caption modules 434 may use localization data provided by the one or more localization modules 432 to edit the closed captions 408 to generate the closed captions 442. The one or more audio modules 436 may use the localization data provided by the one or more localization modules 432 to edit the media 404 (e.g., audio for the video titles), resulting in the media 404. The one or more sentence-level modules 424 may be trained with training data 452, which may be refined based on the sentences 418 and the labels 429 (e.g., different sets of training data may be generated based on the sentence-level and/or title-level labels, and/or based on determinations of which context-based analysis, as described in FIGS. 2A-2D, is most determinative).

Still referring to FIG. 4, the sentences 418 determined to be the most ambiguous (e.g., when the sentence-level label of the labels 429 indicate a probability of a sentence being offensive as between 0.4 and 0.6), the most ambiguous sentences 433 may be provided to a human operator 460 for further review. The human operator 460 may analyze the ambiguous sentences 433 and determine labels 435 indicating the probability that the sentences 433 are offensive. The labels 435 may be provided to the training data 452 to generate updated training data for the one or more sentence-level modules 424.

In one or more embodiments, one or more devices 402 may determine whether identified abusive language is ambiguously abusive or non-ambiguously abusive, and may further evaluate the context of the use of ambiguously abusive language. For example, some words or phrases may be used in abusive ways and non-abusive ways. Some words or phrases may lack any non-abusive meaning or application, and may be considered unambiguously abusive because the context in which they are used may be considered always abusive. To determine whether a word or phrase that matches an abusive word or phrase on a list of abusive words or phrases is ambiguously abusive or non-ambiguously abusive, the one or more devices 402 may determine a first number of media titles (e.g., videos) that include an abusive keyword (e.g., in spoken language and/or closed caption text), and a second number of the first number of media titles that has a rating above the MPAA G rating (or above another rating). In this manner, the second number of media titles may represent a portion of the first number of media titles with a PG, PG-13, R, NC-17, or NR rating from among the total number of media titles that include the abusive keyword. When the portion is above a threshold (e.g., 95% or another number), the abusive keyword may be labeled unambiguously abusive (e.g., a high percentage of media titles using the abusive keyword are given a non-G rating, indicating that the abusive keyword is always or almost always abusive, regardless of its use/context). When the portion fails to exceed the threshold, the abusive keyword may be labeled as ambiguously abusive, and may be analyzed further by the one or more devices 402 to determine whether the ambiguously abusive keyword is used in an abusive or a non-abusive manner in a particular use.

In one or more embodiments, the one or more devices 402 may divide the closed captions 414 into the sentences 418, parses the sentences 418 to identify the abusive keywords 410, analyzes the contextual use of the abusive keywords 410 in the sentences 418, and determines, based on the context, a probability that an abusive keyword is used abusively or non-abusively in a sentence (e.g., the sentence labels 421). The one or more devices 402 may label the sentences 418 with unambiguously abusive keywords as offensive sentences, and the sentences 418 lacking abusive keywords (e.g., all sentences from G-rated media) as non-offensive. The one or more devices 402 may perform context-based analysis of the sentences 418 with ambiguously abusive keywords to determine whether those sentences should be labeled offensive or non-offensive (e.g., based on the context-based determination of whether an ambiguously abusive keyword is used in an abusive or non-abusive manner).

In one or more embodiments, the one or more devices 402 may further refine the analysis of the sentences 418. The sentence labels 421 may experience noise due to the analysis of ambiguous keywords. To alleviate such noise, the one or more devices 402 may train the one or more sentence-level modules 424 using an intermediate classifier, facilitating the generation of sentence probability scores (e.g., probabilities that sentences contain abusive language). For example, a sentence of: "This guy sucks," may be more likely to have a high score, even when a rule for determining abusive word ambiguity (e.g., for the word "sucks") may not be based on the exact sentence, but may be based on similar sentences, such as "He sucks," and "It sucks." In this manner, labeling a sentence with a positive score may provide a more accurate estimate of whether a sentence is offensive than using a binary label of offensive or non-offensive. The intermediate classifier may include a multi-head attention model (e.g., with one hundred heads, or another number). The sentence probability scores may be used to generate training data for the one or more sentence-level modules 424 at a sentence level and/or title level.

In one or more embodiments, the context that may be considered by the one or more devices 402 to determine whether an ambiguously abusive keyword is indeed abusive may include context such as grammar/parts of speech (e.g., noun, verb, adjective, etc.), a location of the abusive keyword in a sentence (e.g., beginning, middle, end, before/after a particular word or part of speech, etc.), translations into another language, and the like. Regarding translations into another language, the one or more devices 402 may evaluate machine translations of closed caption text into one or more other languages, and may determine whether an ambiguously abusive keyword is abusive in the one or more other languages. For example, a word in one language may be ambiguously abusive because that word may be used in some non-abusive forms, but when translated into another language, the use of the word in the other language may be more clearly abusive or non-abusive (e.g., because the translated word may not have both abusive and non-abusive uses in the other language). The one or more devices 402 may use any one or combination of context-based evaluations to determine whether an abusive keyword is abusive or non-abusive. The one or more devices 402 may determine which context (e.g., part of speech, word location, machine translation, etc.) is more determinative in the analysis (e.g., which context is most likely to drive the decision of whether the abusive keyword is abusive). For example, when the part of speech and location analyses do not resolve the ambiguity, but the machine translation results in a strong indication of whether an abusive keyword is abusive or not, the one or more devices 402 determine that the machine translation is most strongly associated with the determination of whether the abusive keyword is indeed abusive. The one or more sentence-level modules 424 may be updated with such information, allowing the ML models to place greater emphasis on certain types of context-based analysis for certain abusive keywords, for example.

In one or more embodiments, the one or more sentence-level modules 424 may use the multi-head attention model 300 of FIG. 3 to analyze the labeled sentences. The one or more sentence-level modules 424 may convert any word ($w_i$) of a sentence with n number of words into a vector (e.g., using global vectors for word presentation). The output of the vector conversion may be provided to an encoding layer (e.g., a bidirectional gated recurrent unit (BiGRU) layer) of the model with a rectified linear unit (ReLU) as an activation function. The BiGRU layer of the model may capture long-term word dependency. The output of the BiGRU layer may be units, $h_i$, provided to a m-head self-attention layer. The use of multiple heads (e.g., m>1) may allow for the possibility that some sentences may have multiple abusive keywords (e.g., a single attention head may not cover all of the abusive keywords of a sentence, so the sentence-level analysis using a single attention head may be incomplete and inaccurate). The n-length weights of the j-th attention head may represented by: $a_j$=softmax(tanh($a_j \cdot H^T + b_j$)), for j=1, . . . , m, where H=[$h_1$, . . . , $h_n$], and ($a_j$, $b_j$) are coefficients. The elements of the vector (e.g., $a_{ij}$, . . . , $a_{nj}$) may represent the importance of any word in determining the label of a sentence for a jth attention head. The output of the attentions, S1 for j=1, . . . , m, may be determined using a weighted average:

$$S_j = \sum_{i=1}^{n} aij \cdot hi.$$

The computer-based system may concatenate the m outputs of the attentions using a fully connected layer with a sigmoid activation function. A loss function may be a cross-entropy, but with a label using a soft target $q_i$. In this manner, the loss may be represented by: L(p,q)=$\Sigma_i$ qilogpi, where $p_i$ is the output of the fully connected layer of the model. Sentence-level attention-based scoring examples are shown above in Table 1.

In one or more embodiments, the one or more devices 402 may apply active learning to the model. For example, the one or more devices 402 may select sentences from pre-dicted G-rated media titles, may identify media titles pre-dicted as having abusive keywords, and may identify the sentences from the media titles predicted as having abusive keywords. The one or more devices 402 may determine the frequency $n_i$ of keywords from the sentences of media titles predicted as having abusive keywords, and may determine the most K ambiguous sentences. The one or more devices 402 may select N sentences for manual labeling. For example, the one or more devices 402 may sample $$N \cdot \frac{n_j}{\sum_{i=1}^{K}} ni$$

for any abusive keyword j in the top K keywords.

The one or more devices 402 may label the N sentences, replicate them a T number of times (e.g., five times, or another number), and combine the N sentences and sentence labels with the training data 452 to retrain the one or more sentence-level modules 424. The N sentences may refer to the sentences 433 described above, and may be sent to the human operator 460 for further analysis.

In one or more embodiments, the one or more devices 402 may generate labels at the media title level. For example, whereas individual sentences of a media title may be rated, the overall media title also may be rated. The one or more devices 402 may determine the expected frequencies of abusive keywords in a media title by adding the respective scores of offensive sentences of the media title. In this manner, the title-level ratings/labels may be based on the sentence-level labeling in that the keyword counts for a title may be based on the identification and classification of sentences of the title that include abusive keywords. Rather than analyzing every word of a title for a title-level label, the one or more devices 402 may filter offensive sentences, and analyze the offensive sentences to determine the label for the title. The one or more devices 402 may accumulate counts of abusive keywords at any severity level, and based on the number of abusive words of different severity levels, the one or more devices 402 may assign a label to a title. For example, title-level labels may include "none" (e.g., no abusive language), "mild" (e.g., some abusive language), "moderate," "strong," and "severe." The "strong" label may correspond to a title recommended only for viewer ages of sixteen an older, a label that does not correspond to a MPAA rating. For example, non-aggressive use of abusive key-words exceeding a threshold (e.g., ten times) in a title and less than a threshold (e.g., two times) use of disparaging slurs in the title may result in the computer-based system labeling the title as "strong."

In one or more embodiments, the one or more devices 402 may localize abusive keywords (e.g., determine when/where the abusive keywords occur in a title), and may respond to the occurrence of abusive keywords based on their location (e.g., within closed caption text and/or audio files). For example, the one or more devices 402 may generate edited closed captions that replace the text of abusive keywords (e.g., by using alternative non-abusive words, replacing abusive keywords with blanks or special characters, etc.). The one or more devices 402 may generate edited audio for the title by inserting alternative non-abusive words where abusive words are identified, muting the sound, "bleeping" the abusive keywords, and the like. The one or more devices 402 may generate tags, warnings, or other indications to be presented to warn a viewer that a title includes abusive language, and may indicate a particular time or portion of the title when an abusive keyword may occur.

The one or more devices 402 and/or the one or more devices 450 may include any suitable processor-driven device including, but not limited to, a mobile device or a non-mobile, e.g., a static, device. For example, the one or more devices 402 and/or the one or more devices 450 may include a user equipment (UE), a station (STA), an access point (AP), a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

The one or more devices 402 may be configured to communicate via a communications network 470, and the one or more devices 450 may be configured to communicate via a communications network 480, wirelessly or wired (e.g., the same or different wireless communications networks). The communications network 470 and/or the communications network 480 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 470 and/or the communications network 480 may have any suitable communication range associated therewith and may include, for example, global networks (e.g., the Internet), metropolitan area networks (MANs), wide area networks (WANs), local area networks (LANs), or personal area networks (PANs). In addition, the communications network 470 and/or the communications network 480 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 5A:
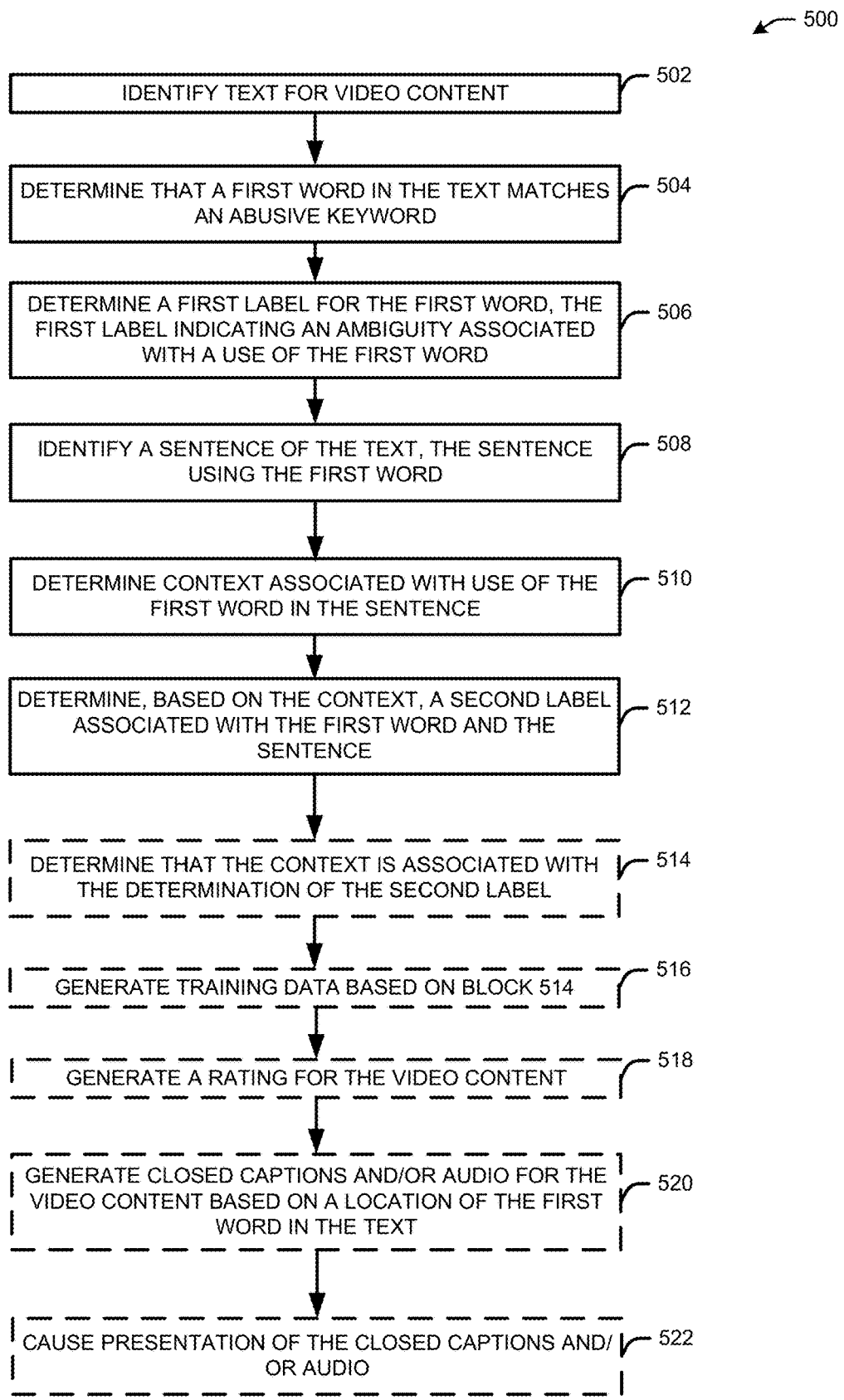
FIG. 5A illustrates a flow diagram for a process for context-based abusive language detection and response, in accordance with one or more example embodiments of the present disclosure.

FIG. 5A illustrates a flow diagram for a process 500 for context-based abusive language detection and response, in accordance with one or more example embodiments of the present disclosure.

At block 502, a device (e.g., the one or more devices 402 of FIG. 4) may identify text (e.g., the closed captions 414 of FIG. 4) for video content (e.g., the media 404 of FIG. 4). The text may represent presentable text that corresponds to words and/or sounds presented with a video (e.g., dialogue, background noise, etc.).

At block 504, the device may determine that a first word (e.g., any word, not necessarily the very first word of the text) of the text matches an abusive keyword (e.g., the abusive keywords 410 of FIG. 4). For example, the device may have access to one or more lists of words and/or phrases identified as abusive, and may search for any forms of the words or phrases within the text.

At block 506, the device may determine a first label for the first word (e.g., unambiguously abusive or ambiguously abusive), the first label indicating whether the first word may be used in some non-abusive context (e.g., ambiguously abusive) or is likely to always be used in an abusive context (or has no non-abusive uses, e.g., unambiguously abusive). To determine whether a word or phrase that matches an abusive word or phrase on a list of abusive words or phrases is ambiguously abusive or non-ambiguously abusive, the device may determine a first number of media titles (e.g., videos) that include the abusive keyword (e.g., in spoken language and/or closed caption text), and a second number of the first number of media titles that has a rating above the MPAA G rating (or above another rating). In this manner, the second number of media titles may represent a portion of the first number of media titles with a PG, PG-13, R, NC-17, or NR rating from among the total number of media titles that include the abusive keyword. When the portion is above a threshold (e.g., 95% or another number), the abusive keyword may be labeled unambiguously abusive (e.g., a high percentage of media titles using the abusive keyword are given a non-G rating, indicating that the abusive keyword is always or almost always abusive, regardless of its use/context). When the portion fails to exceed the threshold, the abusive keyword may be labeled as ambiguously abusive, and may be analyzed further by the device to determine whether the ambiguously abusive keyword is used in an abusive or a non-abusive manner in a particular use.

At block 508, the device may identify a sentence that uses the first word. For example, the device may divide the text into sentences, and may identify specific sentences that include one or more abusive keywords. Using a punctuation-based analysis or other techniques, the device may parse the text to identify individual sentences. When an individual sentence includes an unambiguously abusive keyword, the device may label the sentence as offensive, and may skip blocks 510, 512, and 514. When the device identifies a sentence without an unambiguously abusive keyword, and with an ambiguously abusive keyword, the device may proceed to block 510 for further analysis of the context of the abusive keyword.

At block 510, the device may determine context associated with the use of the abusive keyword (the first word) in a sentence. In one or more embodiments, the context that may be considered by the device to determine whether an ambiguously abusive keyword is indeed abusive may include context such as grammar/parts of speech (e.g., noun, verb, adjective, etc.), a location of the abusive keyword in a sentence (e.g., beginning, middle, end, before/after a particular word or part of speech, etc.), translations into another language, and the like. Regarding translations into another language, the device may evaluate machine translations of closed caption text into one or more other languages, and may determine whether an ambiguously abusive keyword is abusive in the one or more other languages. For example, a word in one language may be ambiguously abusive because that word may be used in some non-abusive forms, but when translated into another language, the use of the word in the other language may be more clearly abusive or non-abusive (e.g., because the translated word may not have both abusive and non-abusive uses in the other language).

At block 512, the device may determine, based on the context of block 510, a second label for the first word and the sentence using the first word (e.g., a refined label indicating a probability that the sentence is offensive). The device may use any one or combination of context-based evaluations to determine whether an abusive keyword is abusive or non-abusive. The device may determine which context (e.g., part of speech, word location, machine translation, etc.) is more determinative in the analysis (e.g., which context is most likely to drive the decision of whether the abusive keyword is abusive). For example, when the part of speech and location analyses do not resolve the ambiguity, but the machine translation results in a strong indication of whether an abusive keyword is abusive or not, the device may determine that the machine translation is most strongly associated with the determination of whether the abusive keyword is indeed abusive. The machine learning model used to analyze sentences may be updated with such information, allowing the model to place greater emphasis on certain types of context-based analysis for certain abusive keywords, for example. The scores shown in Table 1 above represent probabilities that sentences are offensive, for example.

At block 514, the device optionally may determine that some of the context-based analysis may be more indicative of whether the sentence includes abusive language than other context. For example, referring to FIGS. 2A-2D, some context may be more useful to the determination of whether a word is abusive or not. For example, when the word jerk is a noun (e.g., as in the sentence 252), the part of speech may not be a strong indication of whether the word is abusive. For example, the word "jerk" as a noun may refer to a coarse description of a person or to a tug or pulling action. A machine translation may provide a stronger indication of whether the word jerk in the sentence 252 is abusive or not. In this manner, the processes in FIGS. 2A-2D may be refined to emphasize some context of a particular word over other context when determining whether the word (and therefore the sentence using the word) is abusive. To determine which context is more strongly associated with determining whether a word is abusive, the device may determine whether the context results in an unambiguous use of the word in a sentence, or whether the context-based analysis results in more ambiguity (e.g., such as the example of "jerk" as a noun in the sentence 252).

At block 516, the device optionally may generate training data for a ML model (e.g., used to determine the word and/or sentence labels) based on the context. For example, when the type of speech of an abusive word is more likely to indicate whether the word is used in an abusive manner in a sentence than a machine translation or location of the word within the sentence. In this manner, the training data may indicate that, based on the abusive keyword identified, the type of speech represented by the word may be evaluated and given more weight than other context-based analysis.

At block 518, the device may generate a rating (e.g., ratings 440 of FIG. 4) for the video content (e.g., an overall rating for a movie or television show). The device may accumulate counts of abusive keywords at any severity level, and based on the number of abusive words of different severity levels, the device may assign a label to a title. For example, title-level labels may include "none" (e.g., no abusive language), "mild" (e.g., some abusive language), "moderate," "strong," and "severe." The "strong" label may correspond to a title recommended only for viewer ages of sixteen and older, a label that does not correspond to a MPAA rating. For example, non-aggressive use of abusive keywords exceeding a threshold (e.g., ten times) in a title and less than a threshold (e.g., two times) use of disparaging slurs in the title may result in the device labeling the title as "strong."

At block 520, the device may generate closed captions (e.g., the closed captions 442 of FIG. 4) for the video content. The closed captions may represent an edited version of the text at block 502, where identified abusive language may be replaced with non-abusive language and/or characters, indications (e.g., blanks) that the text includes abusive language, and the like. The device may generate audio for the video content, such as edited audio that replaces abusive keywords with non-abusive keywords, bleeps, silence, or other replacements.

At block 522, the device may cause presentation of the edited closed captions and/or audio. For example, the device may send the content to another device (e.g., the one or more devices 450 of FIG. 4) for presentation.

Figure 5B:
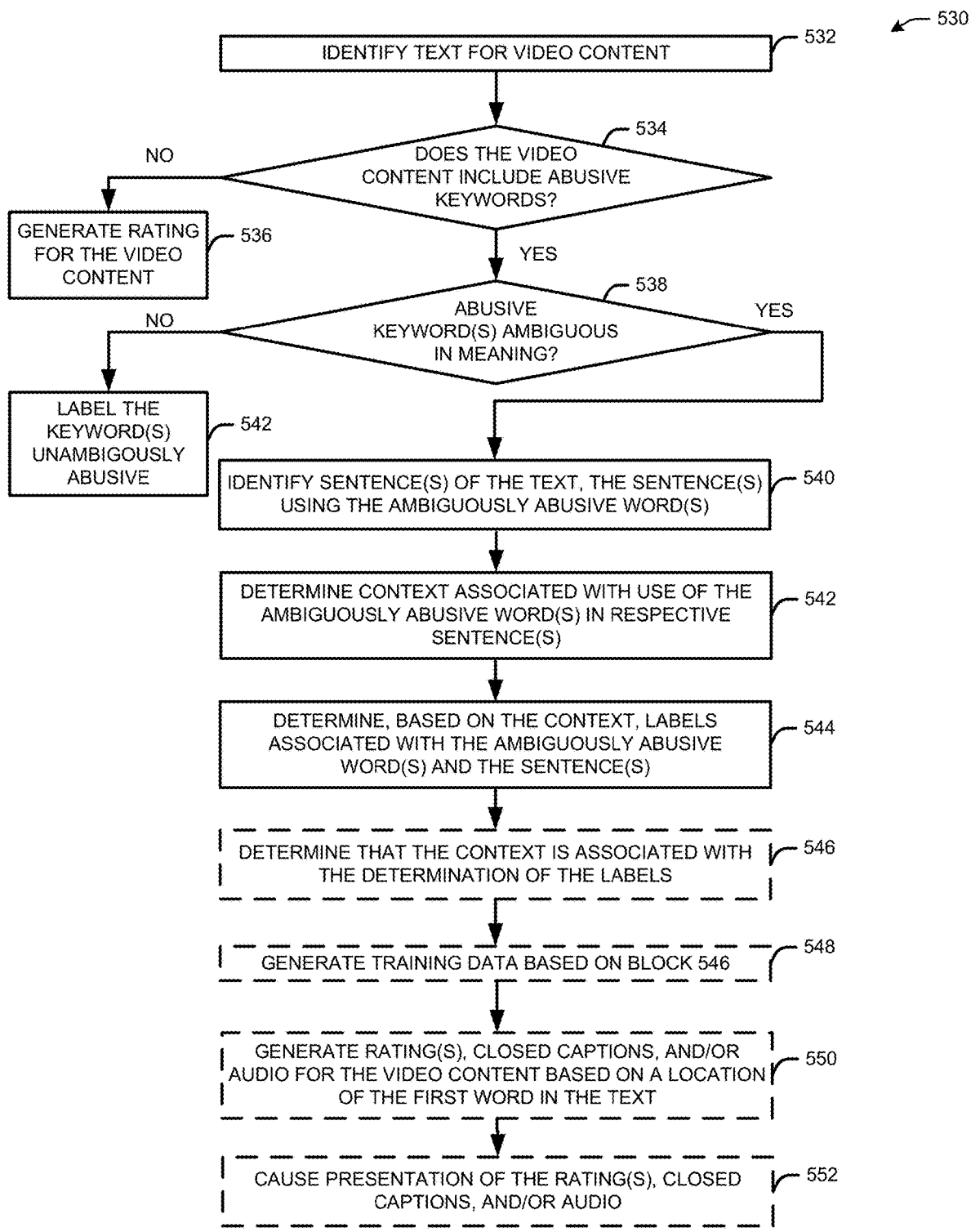
FIG. 5B illustrates a flow diagram for a process for context-based abusive language detection and response, in accordance with one or more example embodiments of the present disclosure.

FIG. 5B illustrates a flow diagram for a process 530 for context-based abusive language detection and response, in accordance with one or more example embodiments of the present disclosure.

At block 532, a device (e.g., the one or more devices 402 of FIG. 4) may identify text (e.g., the closed captions 414 of FIG. 4) for video content (e.g., the media 404 of FIG. 4). The text may represent presentable text that corresponds to words and/or sounds presented with a video (e.g., dialogue, background noise, etc.).

At block 534, the device may determine whether the text for the video content includes any abusive keywords. For example, the device may have access to one or more lists of words and/or phrases identified as abusive, and may search for any forms of the words or phrases within the text. When the video content lacks any abusive keywords, the device may, at block 536, generate a rating for the video content (e.g., a MPAA G-rating, a "none" rating for no abusive language, or another rating). When the device identifies an abusive keyword in the text, the device may continue to block 538.

At block 538, the device may determine whether an identified abusive keyword is ambiguously abusive or unambiguously abusive. To determine whether a word or phrase that matches an abusive word or phrase on a list of abusive words or phrases is ambiguously abusive or non-ambiguously abusive, the device may determine a first number of media titles (e.g., videos) that include the abusive keyword (e.g., in spoken language and/or closed caption text), and a second number of the first number of media titles that has a rating above the MPAA G rating (or above another rating). In this manner, the second number of media titles may represent a portion of the first number of media titles with a PG, PG-13, R, NC-17, or NR rating from among the total number of media titles that include the abusive keyword. When the portion is above a threshold (e.g., 95% or another number), the abusive keyword may be labeled as unambiguously abusive (e.g., a high percentage of media titles using the abusive keyword are given a non-G rating, indicating that the abusive keyword is always or almost always abusive, regardless of its use/context). When the portion fails to exceed the threshold, the abusive keyword may be labeled as ambiguously abusive, and may be analyzed further (e.g., as described below, beginning at block 540) by the device to determine whether the ambiguously abusive keyword is used in an abusive or a non-abusive manner in a particular use.

At block 540, the device may identify one or more sentences in the text having the ambiguously abusive keyword. For example, the device may divide the text into sentences, and may identify specific sentences that include one or more abusive keywords. Using a punctuation-based analysis or other techniques, the device may parse the text to identify individual sentences. When an individual sentence includes an unambiguously abusive keyword, the device may label the sentence as offensive. When the device identifies a sentence without an unambiguously abusive keyword, and with an ambiguously abusive keyword, the device may proceed to block 542 for further analysis of the context of the abusive keyword.

At block 542, the device may determine context associated with the use of the abusive keyword (the first word) in a sentence. In one or more embodiments, the context that may be considered by the device to determine whether an ambiguously abusive keyword is indeed abusive may include context such as grammar/parts of speech (e.g., noun, verb, adjective, etc.), a location of the abusive keyword in a sentence (e.g., beginning, middle, end, before/after a particular word or part of speech, etc.), translations into another language, and the like. Regarding translations into another language, the device may evaluate machine translations of closed caption text into one or more other languages, and may determine whether an ambiguously abusive keyword is abusive in the one or more other languages. For example, a word in one language may be ambiguously abusive because that word may be used in some non-abusive forms, but when translated into another language, the use of the word in the other language may be more clearly abusive or non-abusive (e.g., because the translated word may not have both abusive and non-abusive uses in the other language).

At block 544, the device may determine, based on the context of block 542, labels for the abusive keywords and the sentences using the abusive keywords (e.g., a refined label indicating a probability that the sentence is offensive). The device may use any one or combination of context-based evaluations to determine whether an abusive keyword is abusive or non-abusive. The device may determine which context (e.g., part of speech, word location, machine translation, etc.) is more determinative in the analysis (e.g., which context is most likely to drive the decision of whether the abusive keyword is abusive). For example, when the part of speech and location analyses do not resolve the ambiguity, but the machine translation results in a strong indication of whether an abusive keyword is abusive or not, the device may determine that the machine translation is most strongly associated with the determination of whether the abusive keyword is indeed abusive. The machine learning model may be updated with such information, allowing the model to place greater emphasis on certain types of context-based analysis for certain abusive keywords, for example. The scores shown in Table 1 above represent probabilities that sentences are offensive, for example.

At block 546, the device optionally may determine that some of the context-based analysis may be more indicative of whether the sentence includes abusive language than other context. For example, referring to FIGS. 2A-2D, some context may be more useful to the determination of whether a word is abusive or not. For example, when the word jerk is a noun (e.g., as in the sentence 252), the part of speech may not be a strong indication of whether the word is abusive. For example, the word "jerk" as a noun may refer to a coarse description of a person or to a tug or pulling action. A machine translation may provide a stronger indication of whether the word jerk in the sentence 252 is abusive or not. In this manner, the processes in FIGS. 2A-2D may be refined to emphasize some context of a particular word over other context when determining whether the word (and therefore the sentence using the word) is abusive. To determine which context is more strongly associated with determining whether a word is abusive, the device may determine whether the context results in an unambiguous use of the word in a sentence, or whether the context-based analysis results in more ambiguity (e.g., such as the example of "jerk" as a noun in the sentence 252).

At block 548, the device optionally may generate training data for a ML model (e.g., used to determine the word and/or sentence labels) based on the context. For example, when the type of speech of an abusive word is more likely to indicate whether the word is used in an abusive manner in a sentence than a machine translation or location of the word within the sentence. In this manner, the training data may indicate that, based on the abusive keyword identified, the type of speech represented by the word may be evaluated and given more weight than other context-based analysis.

At block 550, the device may generate a rating (e.g., ratings 440 of FIG. 4) for the video content (e.g., an overall rating for a movie or television show). The device may accumulate counts of abusive keywords at any severity level, and based on the number of abusive words of different severity levels, the device may assign a label to a title. For example, title-level labels may include "none" (e.g., no abusive language), "mild" (e.g., some abusive language), "moderate," "strong," and "severe." The "strong" label may correspond to a title recommended only for viewer ages of sixteen and older, a label that does not correspond to a MPAA rating. For example, non-aggressive use of abusive keywords exceeding a threshold (e.g., ten times) in a title and less than a threshold (e.g., two times) use of disparaging slurs in the title may result in the device labeling the title as "strong." The device may generate closed captions (e.g., the closed captions 442 of FIG. 4) for the video content. The closed captions may represent an edited version of the text at block 532, where identified abusive language may be replaced with non-abusive language and/or characters, indications (e.g., blanks) that the text includes abusive language, and the like. The device may generate audio for the video content, such as edited audio that replaces abusive keywords with non-abusive keywords, bleeps, silence, or other replacements.

At block 552, the device may cause presentation of the edited closed captions and/or audio. For example, the device may send the content to another device (e.g., the one or more devices 450 of FIG. 4) for presentation.

Figure 5C:
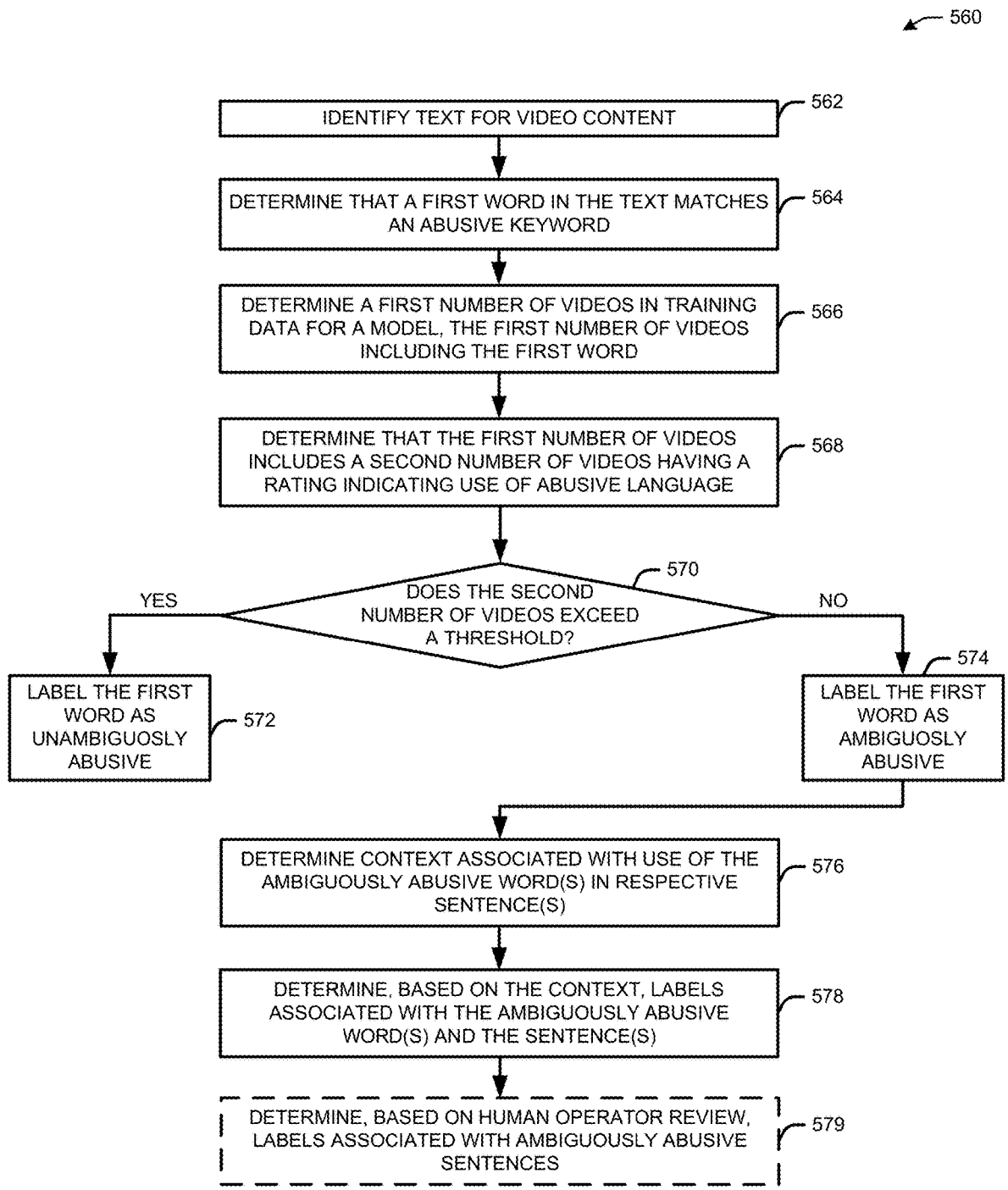
FIG. 5C illustrates a flow diagram for a process for context-based abusive language detection and response, in accordance with one or more example embodiments of the present disclosure.

FIG. 5C illustrates a flow diagram for a process 560 for context-based abusive language detection and response, in accordance with one or more example embodiments of the present disclosure.

At block 562, a device (e.g., the one or more devices 402 of FIG. 4) may identify text (e.g., the closed captions 414 of FIG. 4) for video content (e.g., the media 404 of FIG. 4). The text may represent presentable text that corresponds to words and/or sounds presented with a video (e.g., dialogue, background noise, etc.).

At block 564, the device may determine that a first word (e.g., any word, not necessarily the very first word of the text) of the text matches an abusive keyword (e.g., the abusive keywords 410 of FIG. 4). For example, the device may have access to one or more lists of words and/or phrases identified as abusive, and may search for any forms of the words or phrases within the text.

At block 566, to determine whether the identified abusive keyword is ambiguously abusive or unambiguously abusive, the device may determine a first number of videos in training data (e.g., the training data 452 of FIG. 4) for a model (e.g., the one or more sentence-level modules 424 of FIG. 4). The first number of videos may be the videos that include the identified abusive keyword (e.g., the first word). At block 568, the device may determine that the first number of videos includes a second number of videos with a rating indicative of the use of abusive language (e.g., a rating above "none" or above the MPAA's G-rating). In this manner, the first number of videos may represent the total number of video titles that include the first word, and the second number of videos may represent which of the first number of videos includes a rating higher than a minimum rating.

At block 570, the device may determine whether the second number of videos exceeds a threshold number (or percentage) of videos (e.g., 95% of the first number of videos, or another number). For example, when the second number of videos includes all of the first number of videos, such may be an indication that all videos that include the first word have a rating higher than a minimum rating, indicating the presence of abusive language. When the second number of videos exceed the threshold number number/percentage of videos, the device may, at block 572, label the first word as unambiguously abusive, and may label any sentence of the text that includes the first word as offensive. When the second number of videos fails to exceed the threshold number number/percentage of videos, the device may, at block 574, label the first word as ambiguously abusive, and may further analyze the first word and any sentences using the first word.

At block 576, the device may determine context associated with the use of the abusive keyword (the first word) in a sentence. In one or more embodiments, the context that may be considered by the device to determine whether an ambiguously abusive keyword is indeed abusive may include context such as grammar/parts of speech (e.g., noun, verb, adjective, etc.), a location of the abusive keyword in a sentence (e.g., beginning, middle, end, before/after a particular word or part of speech, etc.), translations into another language, and the like. Regarding translations into another language, the device may evaluate machine translations of closed caption text into one or more other languages, and may determine whether an ambiguously abusive keyword is abusive in the one or more other languages. For example, a word in one language may be ambiguously abusive because that word may be used in some non-abusive forms, but when translated into another language, the use of the word in the other language may be more clearly abusive or non-abusive (e.g., because the translated word may not have both abusive and non-abusive uses in the other language).

At block 578, the device may determine, based on the context of block 542, labels for the abusive keywords and the sentences using the abusive keywords (e.g., a refined label indicating a probability that the sentence is offensive).

The device may use any one or combination of context-based evaluations to determine whether an abusive keyword is abusive or non-abusive. The device may determine which context (e.g., part of speech, word location, machine translation, etc.) is more determinative in the analysis (e.g., which context is most likely to drive the decision of whether the abusive keyword is abusive). For example, when the part of speech and location analyses do not resolve the ambiguity, but the machine translation results in a strong indication of whether an abusive keyword is abusive or not, the device may determine that the machine translation is most strongly associated with the determination of whether the abusive keyword is indeed abusive. The machine learning model may be updated with such information, allowing the model to place greater emphasis on certain types of context-based analysis for certain abusive keywords, for example. The scores shown in Table 1 above represent probabilities that sentences are offensive, for example.

At block 579, the device may identify the most ambiguous sentences (e.g., the sentences 433 of FIG. 4) for further analysis. For example, the device may select sentences from predicted G-rated media titles, may identify media titles predicted as having abusive keywords, and may identify the sentences from the media titles predicted as having abusive keywords. The device may determine the frequency $n_i$ of keywords from the sentences of media titles predicted as having abusive keywords, and may determine the most K ambiguous sentences. The device may select N sentences for manual labeling. For example, the device may sample $$N \cdot \frac{n_j}{\sum_{i=1}^{K} ni} ni$$

for any abusive keyword j in the top K keywords. The device may label the N sentences, replicate them a T number of times (e.g., five times, or another number), and combine the N sentences and sentence labels with sentence-level model training data (e.g., the training data 452) to retrain the one sentence-level model. The N sentences may be sent to the human operator 460 for further analysis. The human operator may refine the sentence-level label of the most ambiguous sentences (e.g., sentences having probabilities of being offensive within the range of 0.4 and 0.6). The refined labels may be used as updated training data.

Figure 5D:
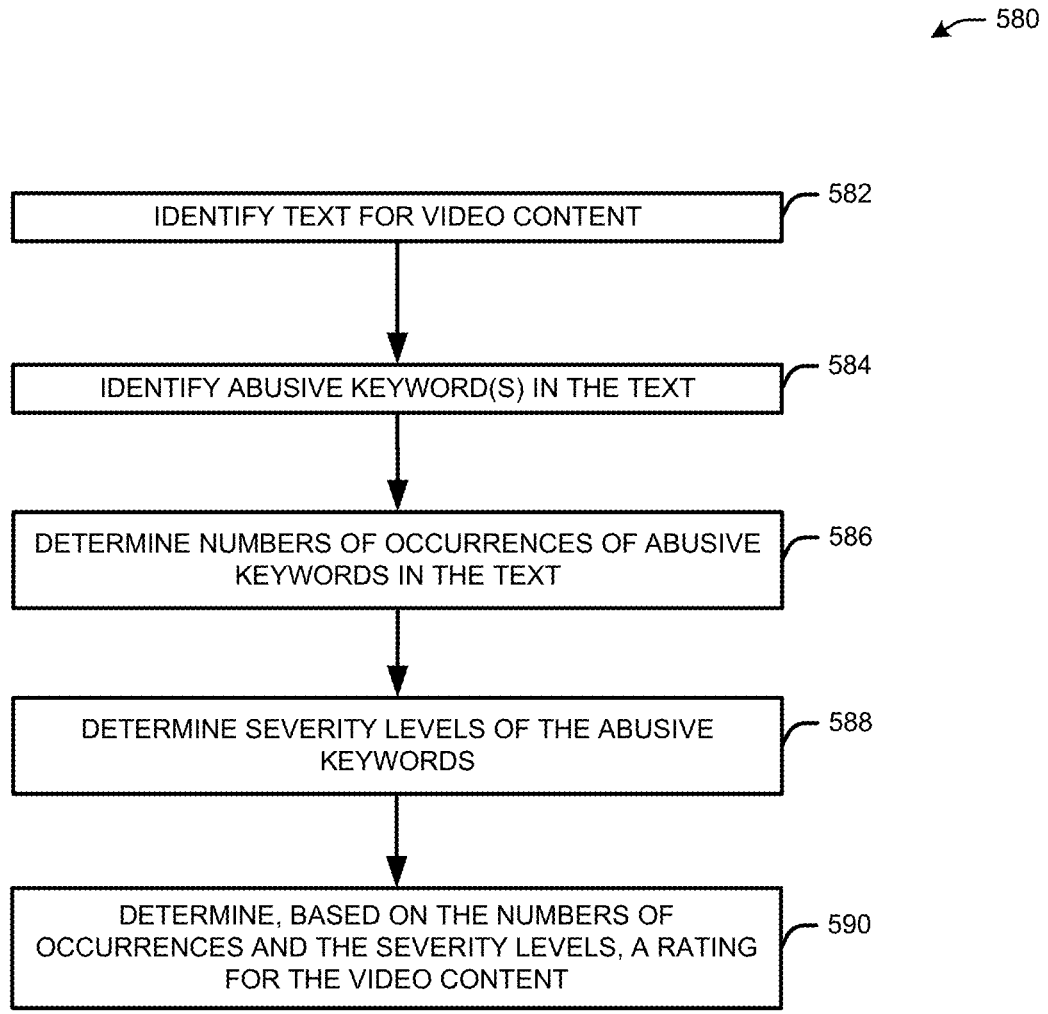
FIG. 5D illustrates a flow diagram for a process for context-based abusive language detection and response, in accordance with one or more example embodiments of the present disclosure.

FIG. 5D illustrates a flow diagram for a process 580 for context-based abusive language detection and response, in accordance with one or more example embodiments of the present disclosure.

At block 582, a device (e.g., the one or more devices 402 of FIG. 4) may identify text (e.g., the closed captions 414 of FIG. 4) for video content (e.g., the media 404 of FIG. 4). The text may represent presentable text that corresponds to words and/or sounds presented with a video (e.g., dialogue, background noise, etc.).

At block 584, the device may identify abusive keywords that appear in the text. For example, the abusive keywords may be included in one or more lists, and using computer-based analysis of the text, the device may identify abusive keywords in the text.

At block 586, the device may determine numbers of occurrences of abusive keywords in the text (e.g., how many times an abusive keywords occur). At block 588, the device may determine severity levels of identified abusive keywords. For example, some keywords may be mildly severe, others moderately severe, and others extremely severe. The more occurrences and/or more severe the abusive keywords, the further above the minimum rating a video title may be (e.g., G, PG, PG-13, R, none, mild, moderate, strong, severe, etc.).

At block 590, the device may determine, based on the numbers of abusive keyword occurrences and/or the severity levels of the identified abusive keywords, a title-level rating for the video content. The device may accumulate counts of abusive keywords at any severity level, and based on the number of abusive words of different severity levels, the computer-based system may assign a label to a title. For example, title-level labels may include "none" (e.g., no abusive language), "mild" (e.g., some abusive language), "moderate," "strong," and "severe." The "strong" label may correspond to a title recommended only for viewer ages of sixteen and older, a label that does not correspond to a MPAA rating. For example, non-aggressive use of abusive keywords exceeding a threshold (e.g., ten times) in a title and less than a threshold (e.g., two times) use of disparaging slurs in the title may result in the computer-based system labeling the title as "strong." In this manner, using sentence-level labels, the device may evaluate the sentences of a title that are labeled as offensive, may determine the number of abusive keywords in the offensive sentences of the media title, may determine the severity of the abusive keywords in the offensive sentences of the media title, and may determine ratings based on rules (e.g., defining limits on the number of abusive keywords of respective severity levels that occur in a media title).

In one or more embodiments, the device may employ a hierarchical multi-head attention network model to analyze media titles for abusive language. The hierarchical multi-head attention network model may include a word-level encoder, a word-level attention layer, a sentence-level encoder, and a sentence-level attention layer. The hierarchical multi-head attention network model may receive as inputs closed caption text and abusive keywords, may determine sentence weights, and may compare the sentence weights to a threshold (e.g., sentence weights indicating the probability of abusive language compared to a threshold probability). Sentences whose weights satisfy the threshold (e.g., exceed a threshold) may be analyzed for occurrences so that a title may be assessed for the number of occurrences of abusive language. Sentence weights satisfying the threshold may indicate that a sentence is likely to include an abusive keyword used in an offensive manner. The device may determine the occurrences of abusive keywords by identifying sentences that include abusive keywords (e.g., whose weights exceed a threshold and indicate the presence of abusive keywords). Based on the number of occurrences of abusive keywords and on the severity of the keywords (e.g., a severity score that is higher for more explicit words or phrases), the device may assign a title-level label. For example, the more occurrences and/or severity of abusive keywords, the more severe the rating may be. Fewer abusive keywords and/or use of less severe abusive keywords may result in less severe ratings. For example, title-level labels may include "none" (e.g., no abusive language), "mild" (e.g., some abusive language), "moderate," "strong," and "severe." In this manner, the title-level labels may be different than MPAA ratings, for example.

The descriptions herein are not meant to be limiting.

Figure 6:
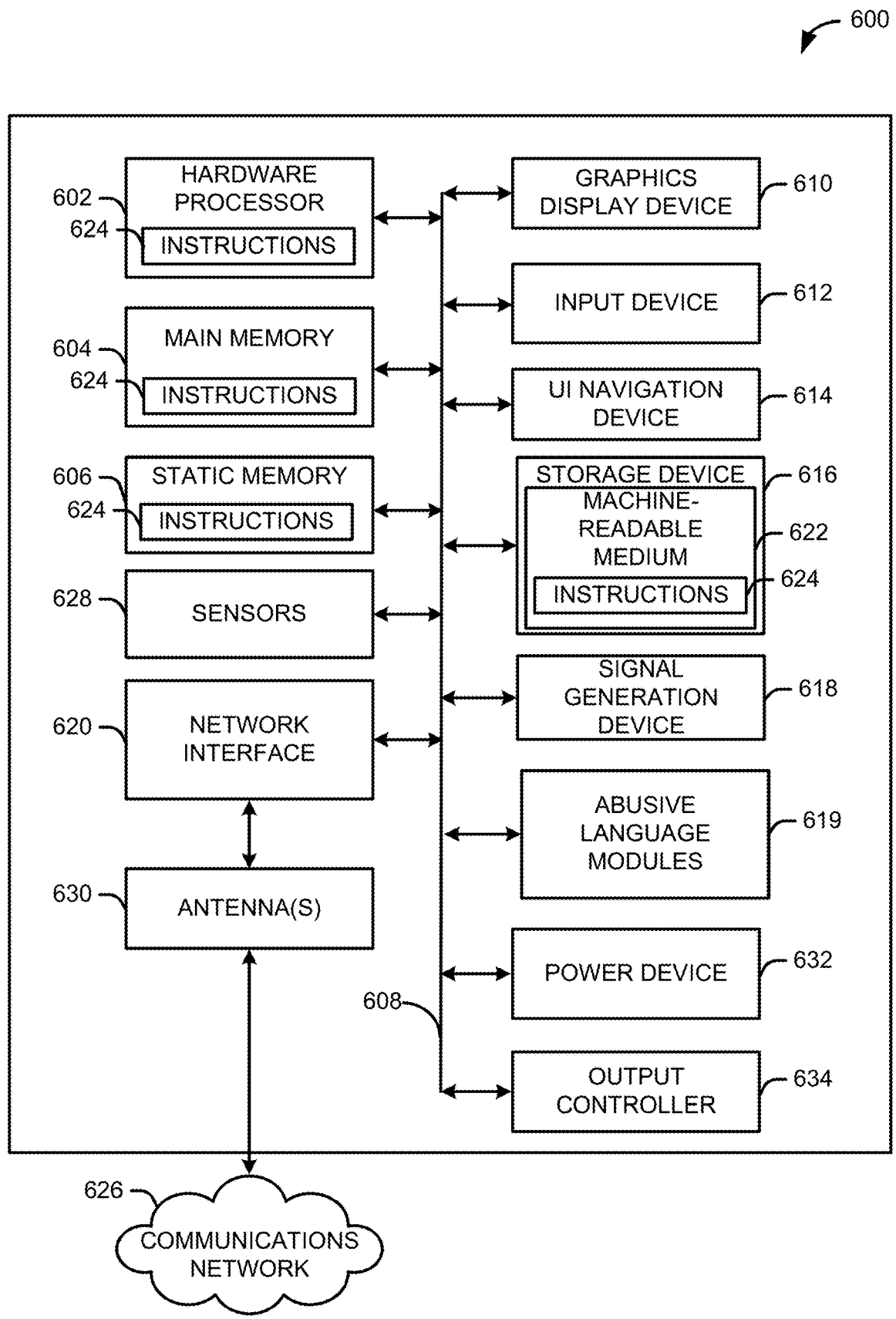
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the one or more devices 402 of FIG. 4, the one or more devices 450 of FIG. 4) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, one or more abusive language modules 619 (e.g., the modules of FIG. 4), a network interface device/transceiver 620 coupled to antenna(s) 630, and one or more sensors 628, such as a microphone, a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, Bluetooth technical standards, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for identifying abusive language in media assets, the method comprising:
   identifying, by at least one processor of a device, a video;
   identifying, by the at least one processor, first closed caption text associated with the video;
   determining, by the at least one processor, that a first word in the first closed caption text matches a first keyword indicative of abusive language;
   determining, by the at least one processor, that a second word in the first closed caption text matches a second keyword indicative of abusive language;
   determining, by the at least one processor, a first number of videos included in first training data for a machine learning model, the first number of videos including the first word;
   determining, by the at least one processor, a second number of videos included in the first training data, the second number of videos including the second word;
   determining, by the at least one processor, based on the first number of videos, a first label associated with the first word, the first label indicating that the first word is unambiguous;
   determining, by the at least one processor, based on the second number of videos, a second label associated with the second word, the second label indicating that the second word is ambiguous;
   identifying, by the at least one processor, a first sentence of the first closed caption text, the first sentence comprising the first word;
   identifying, by the at least one processor, a second sentence of the first closed caption text, the second sentence comprising the second word;
   determining, by the at least one processor, using the machine learning model, a third label associated with the first sentence, the third label indicating that the first sentence comprises abusive language;
   determining, by the at least one processor, using the machine learning model, first context associated with a grammatical use of the second word in the second sentence;
   determining, by the at least one processor, using the machine learning model, second context associated with a location of the second word in the second sentence relative to a third word in the second sentence;
   determining, by the at least one processor, based on the first context and the second context, using the machine learning model, a fourth label associated with the second sentence, the fourth label indicating a first probability that the second sentence comprises abusive language; and
   generating, by the at least one processor, based on the third label and the second label, second closed caption text and video content for presentation.

2. The method of claim 1, further comprising:
   determining, by the at least one processor, using the machine learning model, a second probability that the first context is associated with the fourth label;
   determining, by the at least one processor, using the machine learning model, a third probability that the second context is associated with the fourth label; and
   generating, by the at least one processor, second training data for the machine learning model based on the third label, the fourth label, the second probability, and the third probability.

3. The method of claim 1, further comprising:
   determining a first number of occurrences of the first word in the first closed caption text;
   determining a second number of occurrences of the second word in the first closed caption text;
   determining a first severity score associated with the first word;
   determining a second severity score associated with the second word;
   determining, based on the first number of occurrences, the second number of occurrences, the first severity score, and the second severity score, a fourth label associated with the video; and
   sending an indication that the video is associated with the fourth label for presentation.

4. The method of claim 1, further comprising:
   determining, by the at least one processor, using the machine learning model, a second probability that the second context is associated with the fourth label;

determining, based on the first label, a third probability that the first sentence comprises abusive language, the first probability being one;
determining, based on the second label, the first context, and the second context, a fourth probability that the second sentence comprises abusive language, the second probability being greater than zero and less than one; and
generating second training data for the machine learning model based on the third probability and the fourth probability.

5. The method of claim 1, further comprising:
determining that a third word in the first closed caption text matches a third keyword indicative of abusive language;
determining that the second sentence comprises the third word;
determining, using the machine learning model, a third probability that the second word is associated with the fourth label;
determining, using the machine learning model, a fourth probability that the third word is associated with the fourth label;
determining, using the machine learning model, based on the third probability and the fourth probability, a weighted average associated with the second sentence; and
generating second training data for the machine learning model based on the weighted average.

6. A method for identifying abusive language in media assets, the method comprising:
identifying, by at least one processor of a device, text associated with first video content;
determining, by the at least one processor, that a first word in the text matches a first keyword indicative of abusive language;
determining, by the at least one processor, based on a number of videos including the first word and identified as including abusive language exceeding a threshold number of videos, the number of videos included in first training data for a machine learning model, a first label associated with the first word, the first label indicating that the first word is ambiguous;
identifying, by the at least one processor, a first sentence of the text, the first sentence comprising the first word;
determining, by the at least one processor, first context and second context, the first context and the second context associated with the first word and the first sentence;
determining, by the at least one processor, based on the first context and the second context, using the machine learning model, a second label associated with the first sentence, the second label indicating a first probability that the first sentence comprises abusive language; and
generating, by the at least one processor, based on the first video content and the second label, second video content for presentation.

7. The method of claim 6, further comprising:
determining, using the machine learning model, a second probability that the first context is associated with the second label;
determining, using the machine learning model, a third probability that the second context is associated with the second label; and
generating second training data for the machine learning model based on the second label, the second probability, and the third probability.

8. The method of claim 6, further comprising determining a grammatical use of the first word in the first sentence, wherein determining the second label is based on the grammatical use of the first word in the first sentence.

9. The method of claim 6, wherein the second context is associated with a location of the first word in the first sentence relative to a second word in the first sentence.

10. The method of claim 6, wherein the text is first closed caption text associated with a first language, further comprising:
determining a machine translation of the first sentence from the first language to a second language,
wherein the second context is associated with the machine translation.

11. The method of claim 6, further comprising:
determining a second sentence of the text, the second sentence comprising the first word;
determining, using the machine learning model, a third label associated with the second sentence, the third label indicating a second probability that the second sentence comprises abusive language;
determining, based on a comparison of the second probability to a threshold probability, that the second sentence comprises abusive language;
determining a first number of occurrences of the first word in the text;
determining a second number of occurrences of a second word in the text, wherein the second word is in the first sentence;
determining a first severity score associated with the first word;
determining a second severity score associated with the second word;
determining, based on the first number of occurrences, the second number of occurrences, the first severity score, and the second severity score, a third label associated with the video content; and
sending an indication that the video content is associated with the third label for presentation.

12. The method of claim 6, further comprising:
determining that a second word in the text matches a second keyword indicative of abusive language;
determining that a second sentence of the text comprises the second word;
determining, using the machine learning model, a third label associated with the second sentence, the third label indicating that the second sentence comprises abusive language;
determining, using the machine learning model, a second probability that the second word is associated with the third label;
determining, using the machine learning model, a third probability that the second word is associated with the third label;
determining, using the machine learning model, based on the second probability and the third probability, a weighted average associated with the second sentence; and
generating second training data for the machine learning model based on the weighted average.

13. The method of claim 6, further comprising:
determining that the first probability is between 0.4 and 0.6;
sending an indication that the first probability is between 0.4 and 0.6;
receiving a third label for the first sentence, the third label indicating a second probability that the first sentence comprises abusive language, the first probability different than the second probability; and generating second training data for the machine learning model based on the third label.

14. The method of claim 6, wherein the text is first closed caption text, wherein generating the second video content comprises generating second closed caption text, and wherein the first word of the first closed caption text is replaced in the second closed caption text.

15. The method of claim 6, wherein the first video content is associated with first audio content comprising the first word, wherein generating the second video content comprises generating second audio content, and wherein the first word of the first audio content is replaced in the second audio content.

16. The method of claim 6, further comprising determining, based on a mapping associated with the second label and five or fewer ratings, a rating associated with the first video content.

17. A system comprising memory coupled to at least one processor, the at least one processor configured to:
identify text associated with first video content;
determine that a first word in the text matches a first keyword indicative of abusive language;
determine, using a machine learning model and based on a number of videos including the first word and identified as including abusive language exceeding a threshold number of videos, the number of videos included in first training data for the machine learning model, a first label associated with the first word, the first label indicating that the first word is ambiguous;
identify a first sentence of the text, the first sentence comprising the first word;
determine, using the machine learning model, first context and second context, the first context and the second context associated with the first word and the first sentence;
determine, based on the first context and the second context, using the machine learning model, a second label associated with the first sentence, the second label indicating a first probability that the first sentence comprises abusive language; and
generate, based on the first video content and the second label, second video content for presentation.

18. The system of claim 17, wherein the at least one processor is further configured to:
determine, using the machine learning model, a second probability that the first context is associated with the second label;
determine, using the machine learning model, a third probability that the second context is associated with the second label; and
generate second training data for the machine learning model based on the second label, the second probability, and the third probability.

19. The system of claim 17, wherein the at least one processor is further configured to:
determine that a second word in the text matches a second keyword indicative of abusive language;
determine that a second sentence of the text comprises the second word;
determine, using the machine learning model, a third label associated with the second sentence, the third label indicating that the second sentence comprises abusive language;
determine, using the machine learning model, a second probability that the second word is associated with the third label;
determine, using the machine learning model, a third probability that the second word is associated with the third label;
determine, using the machine learning model, based on the second probability and the third probability, a weighted average associated with the second sentence; and
generate second training data for the machine learning model based on the weighted average.

* * * * *